US007983131B2

(12) United States Patent
Kato et al.

(10) Patent No.: US 7,983,131 B2
(45) Date of Patent: Jul. 19, 2011

(54) INFORMATION RECORDING APPARATUS, INFORMATION RECORDING METHOD AND INTEGRATED CIRCUIT

(75) Inventors: Hisae Kato, Osaka (JP); Hiroshi Ueda, Nara (JP); Motoshi Ito, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/714,705

(22) Filed: Mar. 1, 2010

(65) Prior Publication Data
US 2010/0226219 A1    Sep. 9, 2010

(30) Foreign Application Priority Data

Mar. 5, 2009  (JP) ................................. 2009-051726

(51) Int. Cl.
*G11B 7/00* (2006.01)
(52) U.S. Cl. ............... 369/53.36; 369/47.14; 369/53.31; 369/53.12
(58) Field of Classification Search ................. 369/53.36
See application file for complete search history.

(56) References Cited

U.S. PATENT DOCUMENTS 5,161,072 A    11/1992  Ai
5,937,427 A *  8/1999  Shinagawa et al. ........... 711/113
6,111,708 A *  8/2000  Jewell et al. .................... 360/31
7,821,897 B2* 10/2010  Fuchiwaki ................. 369/53.31
2010/0157750 A1*  6/2010  Chen et al. ................. 369/47.14

FOREIGN PATENT DOCUMENTS

JP    8-328752    12/1996
JP    2800319     7/1998

\* cited by examiner

*Primary Examiner* — Jorge L Ortiz Criado
(74) *Attorney, Agent, or Firm* — Wenderoth, Lind & Ponack, L.L.P.

(57) ABSTRACT

An information recording apparatus is provided with a recording controller for recording data on an information recording medium, a verification controller for verifying whether or not the recorded data can be correctly reproduced, a continuous recording controller for providing a gap region of a specified interval between a verification region and a recording region and successively performing a verify processing and a record processing with rotation waiting in between, an error region discriminator for discriminating an error region in the event of an error in the process of performing the verify processing and the record processing, and an error processor for performing an error processing according to the error region. The error processor performs an error processing different from the one performed when an error occurred in either one of the verification region and the recording region if an error is discriminated to have occurred in the gap region. By this construction, a recording time is shortened and it is prevented that data cannot be recorded on the information recording medium.

19 Claims, 18 Drawing Sheets

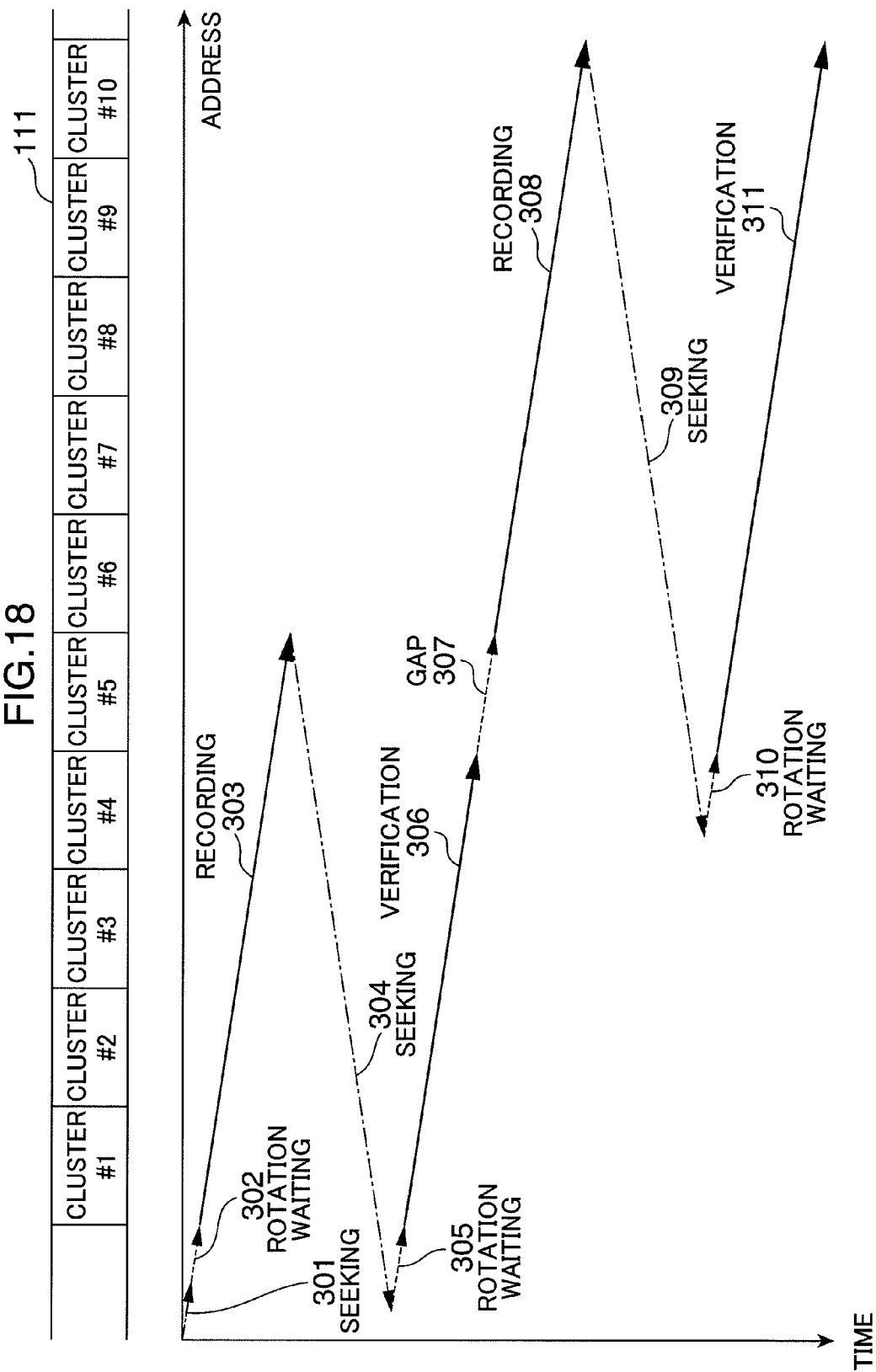

INFORMATION RECORDING APPARATUS, INFORMATION RECORDING METHOD AND INTEGRATED CIRCUIT

BACKGROUND OF THE INVENTION

1. Field of the Invention

The present invention relates to an information recording apparatus, an information recording method and an integrated circuit for recording information on an information recording medium such as an optical disc.

2. Description of the Background Art

Optical discs such as BDs (Blu-Ray Discs), DVDs (Digital Versatile Discs) and CDs (Compact Discs) are known information recording media.

A recording method called a write and verify processing is known as a recording method for such optical discs. The write and verify processing is a data recording method for recording data (information) while ensuring the reliability thereof by reproducing the data after the recording thereof and checking (verifying) whether or not the data can be correctly reproduced.

A conventional write and verify processing is described below with reference to drawings.

FIG. 14 is a diagram showing the construction of a conventional information recording apparatus 101. In FIG. 14, the information recording apparatus 101 is provided with a disc motor 112, an optical pickup 113, a servo controller 114, a buffer memory 115, a host interface 116, a recording/reproducing unit 118, and a drive controller 122. The recording/reproducing unit 118 includes a modem 119, an error correction coder 120 and a recording/reproduction controller 121.

The disc motor 112 rotates an optical disc 111. The optical pickup 113 irradiates the optical disc 111 with a laser beam to reproduce and record data from and on the optical disc 111. The servo controller 114 controls the disc motor 112 and the optical pickup 113 to optimally control a number of revolutions, focusing and tracking.

The drive controller 122 controls the overall operation of the information recording apparatus 101. The drive controller 122 performs an error processing according to a generated error. The recording/reproducing unit 118 performs a data processing for recoding or reproduction. The recording/reproducing unit 118 includes the modem 119, the error correction coder 120 and the recording/reproduction controller 121, wherein the recording/reproduction controller 121 controls the modem 119 and the error correction coder 120. The recording/reproducing unit 118 also returns a result of a record or reproduction (verify) processing instructed from the drive controller 122 as a status to the drive controller 122.

The modem 119 decodes reproduced data obtained from the optical pickup 113 to generate decoded data at the time of data reproduction. The modem 119 modulates coded data obtained from the error correction coder 120 to generate recording data at the time of data recoding. However, the modem 119 cannot simultaneously modulate and demodulate.

The error correction coder 120 performs an error correction to the decoded data obtained from the modem 119 and stores it in the buffer memory 115 at the time of data reproduction. The error correction coder 120 codes the data stored in the buffer memory 115 to generate coded data. However, the error correction coder 120 cannot simultaneously perform an error correction and coding.

The buffer memory 115 stores reproduced data and data to be recorded. The buffer memory 115 transmits and receives data to and from a host 117 via the host interface 116.

FIG. 15 is a flow chart showing the conventional write and verify processing performed to a rewritable optical disc.

First of all, in Step S101, the drive controller 122 instructs the servo controller 114 to move the optical pickup 113 to a position before a data recording region to have data recorded therein. The servo controller 114 controls the optical pickup 113, causes the optical pickup 113 to move to the position before the data recording region and waits on standby (waits for rotation) until the optical pickup 113 reaches the data recording region.

Further, the drive controller 122 issues a record command to the recording/reproducing unit 118. Upon the issuance of the record command, the recording/reproduction controller 121 reads data to be recorded stored in the buffer memory 115 to the error correction coder 120. The error correction coder 120 codes the read data to generate coded data, and outputs it to the modem 119. The modem 119 modulates the coded data to generate recording data.

Subsequently, in Step S102, the recording/reproduction controller 121 controls the optical pickup 113 to irradiate the optical disc 111 with a laser beam, thereby recording the recording data on the optical disc 111 when the optical pickup 113 reaches the data recording region. The recording/reproduction controller 121 returns a recording result as a status to the drive controller 122.

Subsequently, in Step S103, the drive controller 122 discriminates based on the status transmitted from the recording/reproduction controller 121 whether or not any error has occurred during the execution of the record command. If an error is judged to have occurred (YES in Step S103), a processing of Step S104 follows. On the other hand, no error occurrence is judged (NO in Step S103), a processing of Step S105 follows.

Subsequently, in Step S104, the drive controller 122 controls the recording/reproducing unit 118 to perform a defect replacement processing for recording the data stored in the buffer memory 115 and to be recorded in a region where the error occurred in a spare region. The processing of Step S104 corresponds to a recording error processing.

Subsequently, in Step S105, the drive controller 122 instructs the servo controller 114 to move the optical pickup 113 to a position before a region to be verified. The servo controller 114 controls the optical pickup 113 to move the optical pickup 113 to the position before the region to be verified, and waits on standby (waits for rotation) until the optical pickup 113 reaches the region to be verified. Further, the drive controller 122 issues a verify command to the recording/reproducing unit 118.

Subsequently, in Step S106, the recording/reproduction controller 121 controls the optical pickup 113 to irradiate the optical disc 111 with a laser beam and reproduce the data from the optical disc 111 when the optical pickup 113 reaches the region to be verified. The modem 119 demodulates the reproduced data to generate demodulated data, and the error correction coder 120 performs an error correction to the demodulated data and stores it in the buffer memory 115. The recording/reproduction controller 121 returns a verification result as a status to the drive controller 122.

Subsequently, in Step S107, the drive controller 122 discriminates based on the status whether or not any error has occurred during the execution of the verify command. If an error is judged to have occurred (YES in Step S107), a processing of Step S108 follows. On the other hand, if no error occurrence is judged (NO in Step S107), a processing of Step S111 follows.

Subsequently, in Step S108, the drive controller 122 controls the recording/reproducing unit 118 to perform a power-up retry processing for performing a record processing and a verify processing again to the verification region where the error occurred with a recording power changed.

Subsequently, in Step S109, the drive controller 122 discriminates based on the status whether or not any error has occurred during the execution of the power-up retry processing. If an error is judged to have occurred (YES in Step S109), a processing of Step S110 follows. On the other hand, if no error occurrence is judged (NO in Step S109), the processing of Step S111 follows.

Subsequently, in Step S110, the drive controller 122 controls the recording/reproducing unit 118 to perform a defect replacement processing for recording the data stored in the buffer memory 115 and to be recorded in the region where the error occurred in a spare region. The processings of Steps S108 to S110 correspond to a verification error processing.

Subsequently, in Step S111, the drive controller 122 discriminates whether there is any region to be verified. If a region to be verified is judged to be present (YES in Step S111), the processing of Step S105 follows. On the other hand, if the absence of the region to be verified is judged (NO in Step S111), a processing of Step S112 follows.

Subsequently, in Step S112, the drive controller 122 discriminates whether or not there is any processing requiring region where the write and verify processing should be performed. If a processing requiring region is judged to be present (YES in Step S112), the processing of Step S101 follows. On the other hand, if the absence of the processing requiring region is judged (NO in Step S112), the write and verify processing is ended.

FIG. 16 is a chart showing an operation of the conventional information recording apparatus 101 in chronological order.

In FIG. 16, the optical disc 111 is composed of a plurality of clusters. Each cluster is a recording unit by which data is recorded on the optical disc 111. A BD is composed of 32 sectors, and a DVD is composed of 16 sectors. Here, it is assumed that the buffer memory 115 can store data of 5 clusters.

In the event of an error during the verification, the defect replacement processing for recording data in a spare region is performed in Step S110 of FIG. 15. Thus, data to be recorded has to be stored in the buffer memory 115 until the verification is completed. Therefore, a region where data can be recorded in one processing is limited to a storable data amount (5 clusters) of the buffer memory 115. In one processing of recording data of 10 clusters as in FIG. 16, the write and verify processing comprised of the record processing and the verify processing is performed twice. If it is assumed that a region to be verified is a verification region and a region to have data recorded therein is a recording region, there are a seeking motion 207 and a rotation waiting motion 208, which are redundant, between a first verification region 206 and a second recording region 209.

As described above, in the conventional write and verify processing, the redundant seeking and rotation waiting are present between verification and recording, whereby there was a problem of elongating a recording time. Influences caused by this problem become larger as data to be recorded increases, the capacity of the buffer memory decreases or multiple speed increases.

Accordingly, Japanese Unexamined Patent Publication No. H08-328752 discloses a method for successively performing verification and recording by eliminating redundant seeking and rotation waiting. However, the modem 119 cannot simultaneously perform modulation and demodulation and the error correction coder 120 cannot simultaneously perform error correction and coding. Further, a period from the end of the verification region to the leading end of the recording region is very short. Thus, it is difficult to instantaneously switch the modem 119 and the error correction coder 120 and generate modulated recording data until the leading end of the recording region is reached.

As shown in FIG. 17, the demodulation in the modem 119 is completed at an end 221 of the verification region, and an error correction can be performed by the error correction coder 120 to discriminate whether or not any error has occurred during the verification at a point of time 222 after the recording is started. In other words, if an error-correction error occurred during the verification in a region immediately before the recording region and the processing was interrupted, data is already recorded in the next region. Accordingly, in the case of application to a recordable optical disc such as a BD-R, there is a problem that data is not correctly recorded in a recording region next to a verification region where an error occurred during verification.

Accordingly, Publication of Japanese Patent No. 2800319 discloses a method for reducing the number of clusters to be verified and providing a specified region (gap region 307) between a verification region 306 and a recording region 308 as shown in FIG. 18 in order to ensure a time until preparation for the next recording is completed. According to this method, the recording/reproduction unit 118 can generate recording data until the optical pickup 113 reaches the leading end of the recording region 308 from the end of the verification region 306. Further, even if an error-correction error occurs in the verification region 306, the processing can be interrupted without recording data in the next recording region, wherefore application to a recordable optical disc such as a BD-R is possible.

In a write and verify processing of Publication of Japanese Patent No. 2800319, the record processing is started until a recording start position is reached after the verify processing is performed. However, a record processing starting control considering a timing to catch up with the start of recording is necessary in the conventional write and verify processing. Since a time required for the optical pickup 113 to pass the gap region changes according to a multiple speed or a radial position, it is difficult to control the start timing of the record processing.

Thus, there is a recording method for adding a function of performing a sequence of the verify processing, the gap region passage and the record processing at once and performing a series of processings upon one processing start. In the batch recording method for performing the processings at once, it is sufficient to perform a start processing similar to the conventional one at the start of verification and the above timing control is unnecessary. Therefore, the write and verify processing is preferably realized by this recording method.

However, since information only on an execution result can be obtained for one processing start in the batch recording method, it cannot be discriminated in which of the verification region, the gap region and the recording region an error occurred.

Since a characteristic of the cause of error differs depending on whether the region where the error occurred is the verification region or the recording region in the conventional information recording apparatus, an error processing suitable for each characteristic is performed.

A main cause of error occurring in the recording region is an initial defect which occurs in the optical disc manufacturing process, or a secondary defect such as scratches and fingerprint adhesion which occur upon using an optical disc and deterioration of the optical disc with time. A defect has a high possibility of recurring errors even if a retry such as rewriting is made since the region itself is defective. Thus, in the event of an error in the recording region, a defect replacement processing is performed to record information in a spare recording region (spare region) free from defects.

Since the verify processing is performed to the region where information could be normally recorded, a servo adjustment or a power adjustment of a laser beam becomes insufficient due to a characteristic variation of the optical disc or the optical pickup in addition to an error resulting from a medium defect, thereby deteriorating recording quality or reproduction quality. This makes it impossible to perform an error correction and causes a servo deviation, which causes an error occurring in the verification region. Such an error has a high possibility of being corrected by rewriting and reverifying with the laser beam power or servo adjusted. Thus, in the event of an error in the verification region, a power-up retry processing for rewriting with the recording power changed is performed. If an error occurs nevertheless, it is known to perform a defect replacement processing similar to the recording.

A main cause of error occurring in the gap region is late recording preparation such as switching of the modem and the error correction coder and generation of recording data for the start of the recording and a servo deviation due to an accidental impact on a drive. If the recording preparation is late for the start of the recording, a processing specific to the gap region for ensuring the gap region necessary for the recording preparation by extending the gap region has to be performed. Further, since the record processing and the verify processing are not performed in the gap region, it is not necessary to perform a defect replacement processing and a power-up retry processing for such an error.

However, it cannot be discriminated in which of the verification region, the gap region and the recording region an error occurred in the batch recording method. Thus, if the defect replacement processing as an error processing in the recording region is performed when an error occurred, it is performed also to the verification region that can be reproduced by rewriting and reverifying and the gap region that can be normally verified and requires no defect replacement processing. As a result, there is a possibility that a recording time increases, the spare region is used up and data cannot be recorded on the optical disc.

If the power-up retry processing and the defect replacement processing as error processings in the verification region are performed in the event of an error, they are performed also to the recording region that has a high possibility of errors even if the power-up retry processing is performed and the gap region that can be normally verified and requires no power-up retry processing and defect replacement processing. As a result, there is a possibility of increasing a recording time.

As described above, in the conventional information recording apparatus, it cannot be discriminated in which of the verification region, the gap region and the recording region an error occurred. Thus, if error processing(s) unstable for the region where the error occurred is/are performed, the unnecessary defect replacement processing and power-up retry processing are performed, which causes problems of increasing the recording time, using up the spare region and being unable to record data on the optical disc.

Since an error occurring when the recording preparation cannot be made in time results from the switching of the modem and the error correction coder, this is an error which occurs also in the verification region or the recording region. However, the gap region needs not be extended when an error occurs in the verification region or the recording region. Thus, if it cannot be discriminated in which region an error occurred, the gap region is always extended, which causes problems of increasing a gap region passing time and increasing the recording time.

SUMMARY OF THE INVENTION

In order to solve the above problem, an object of the present invention is to provide an information recording apparatus, an information recording method and an integrated circuit capable of shortening a recording time and preventing data recording on an information recording medium from becoming impossible.

One aspect of the present invention is directed to an information recording apparatus comprising a recorder for recording data on an information recording medium; a verifier for verifying whether or not the data recorded by the recorder can be correctly reproduced; a continuous recorder for providing a gap region of a specified interval between a verification region to be verified by the verifier and a recording region to have data recorded therein by the recorder and successively performing a verify processing and a record processing with rotation waiting in between; an error region discriminator for discriminating an error region in the event of an error in the process of performing the verify processing and the record processing by the continuous recorder; and an error processor for performing an error processing according to the error region discriminated by the error region discriminator, wherein the error processor performs an error processing different from the one performed when an error occurred in either one of the verification region and the recording region if an error is discriminated to have occurred in the gap region by the error region discriminator.

According to this construction, the data is recorded on the information recording medium and it is verified whether or not the recorded data can be correctly reproduced. The gap region of the specified interval is provided between the verification region to be verified and the recording region to have the data recorded therein, and the verify processing and the record processing are successively performed with rotation waiting in between. When an error occurred in the process of performing the verify processing and the record processing, an error region is discriminated and the error processing is performed according to the region where the discriminated error occurred. At this time, if the error is discriminated to have occurred in the gap region, the error processing is performed which is different from the one performed when the error is discriminated to have occurred in either one of the verification region and the recording region.

According to the present invention, the error processing suitable for the error region is performed and unnecessary defect replacement processing and retry processing are not performed, wherefore a recording time can be shortened. Further, since a spare region is effectively utilized by performing no unnecessary defect replacement processing, it can be prevented that data cannot be recorded on the information recording medium.

These and other objects, features and advantages of the present invention will become more apparent upon the reading of the following detailed description. Further, advantages of the present invention will become more apparent in the following description with reference to accompanying drawings.

BRIEF DESCRIPTION OF THE DRAWINGS

FIG. 18 is a chart showing another operation of the conventional information recording apparatus in chronological order in the case of performing the write and verify processing.

DETAILED DESCRIPTION OF THE PREFERRED EMBODIMENTS OF THE INVENTION

Hereinafter, one embodiment of the present invention is described in detail with reference to the drawings. The following embodiment is a specific example of the present invention and not of the nature to limit the technical scope of the present invention.

Figure 1:
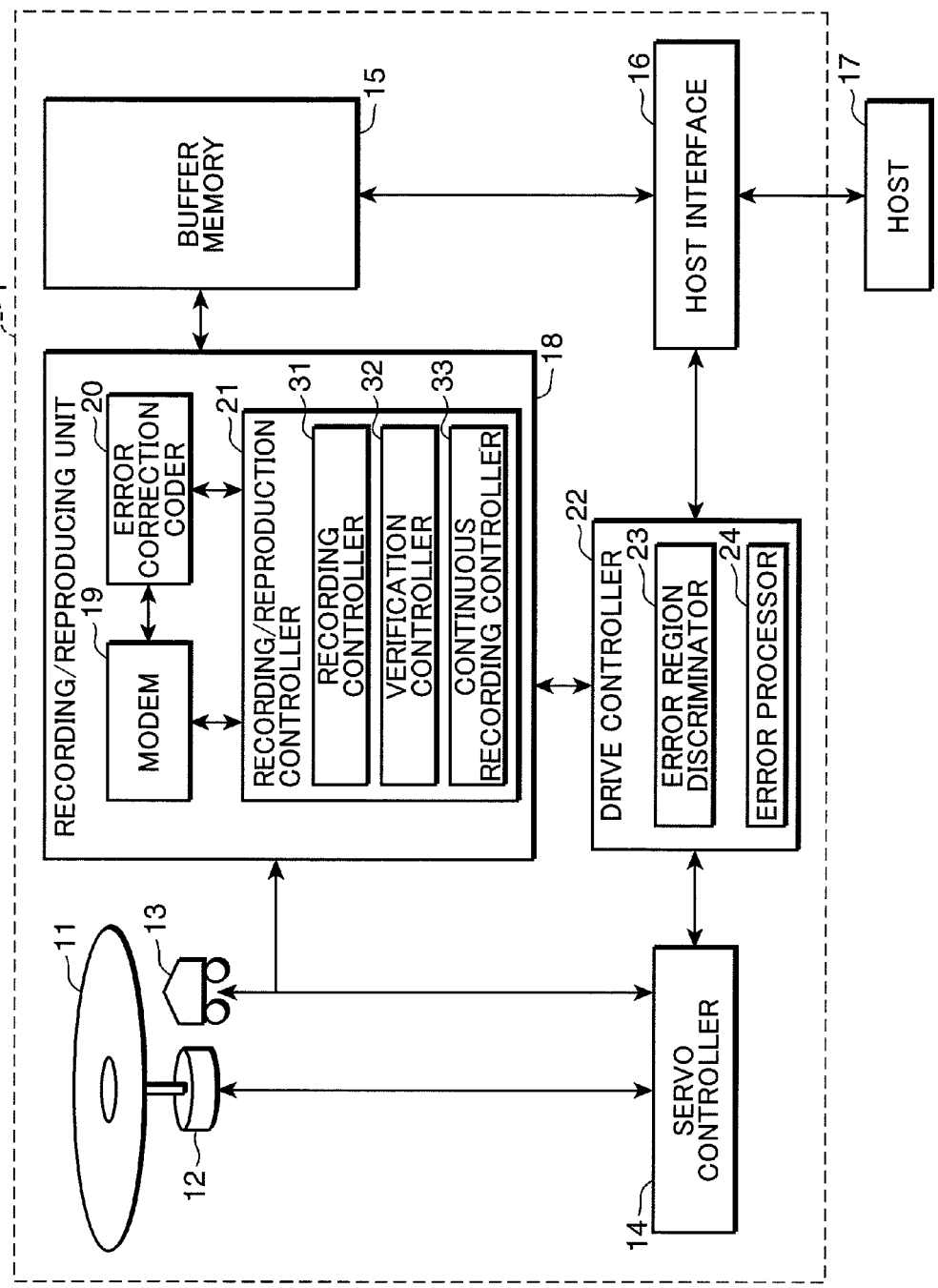
FIG. 1 is a diagram showing the construction of an information recording apparatus according to one embodiment of the invention.

FIG. 1 is a diagram showing the construction of an information recording apparatus 1 according to one embodiment of the present invention. In FIG. 1, the information recording apparatus 1 is provided with a disc motor 12, an optical pickup 13, a servo controller 14, a buffer memory 15, a host interface 16, a recording/reproduction unit 18 and a drive controller 22. The recording/reproduction unit 18 includes a modem 19, an error correction coder 20 and a recording/reproduction controller 21.

Figure 14:
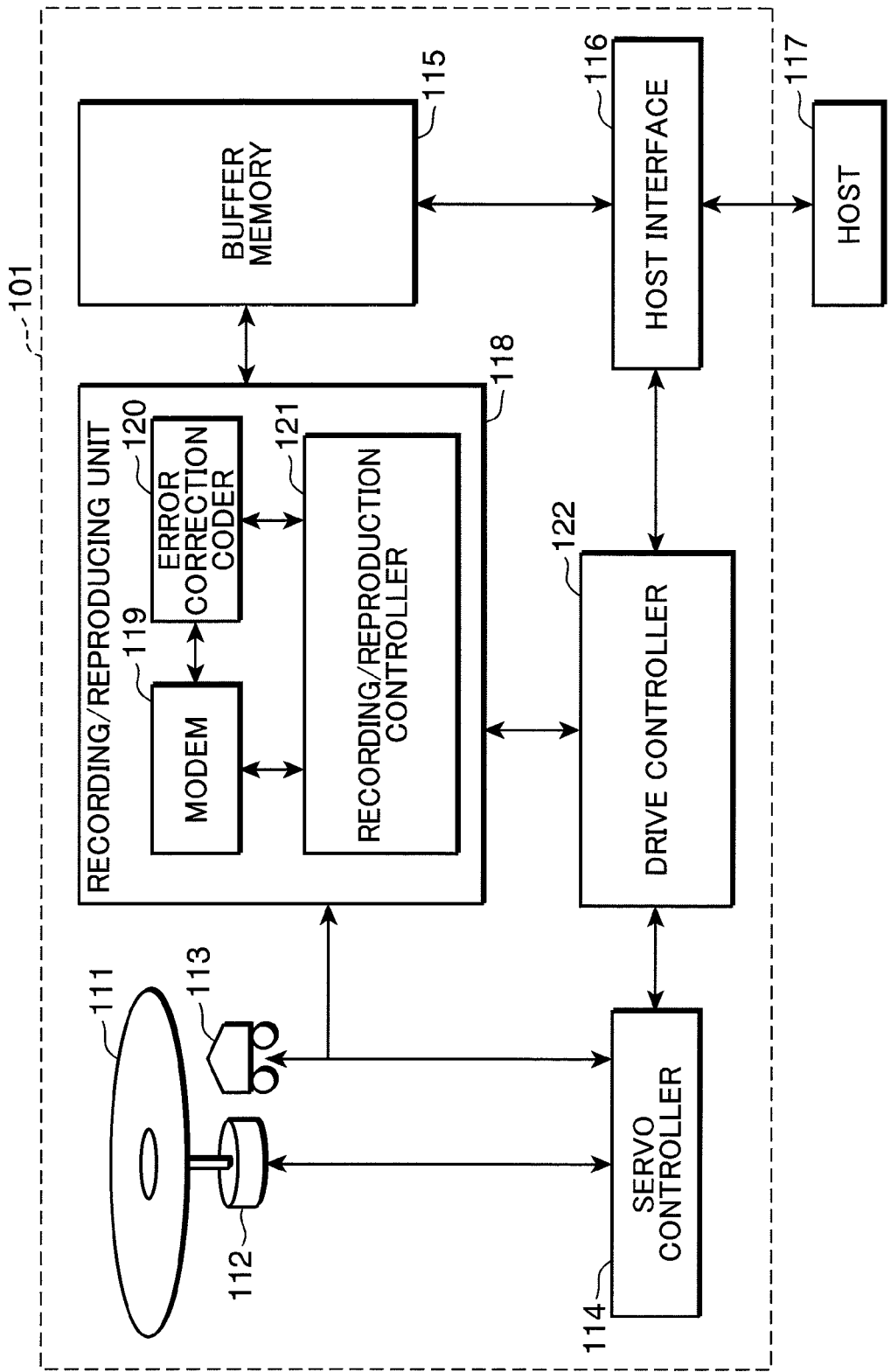
FIG. 14 is a diagram showing a conventional information recording apparatus.
Figure 15:
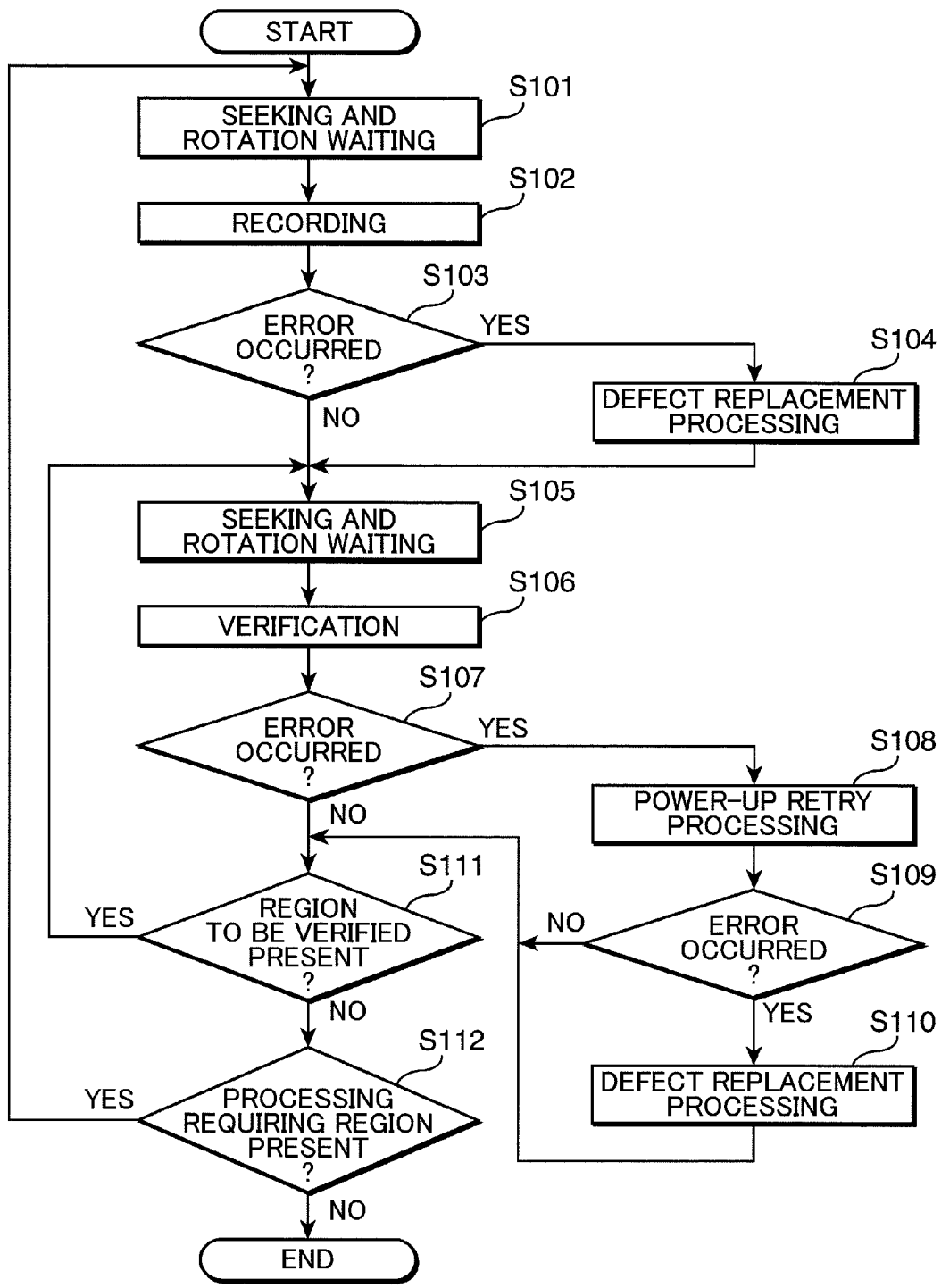
FIG. 15 is a flow chart showing a conventional write and verify processing performed to a rewritable optical disc.
Figure 16:
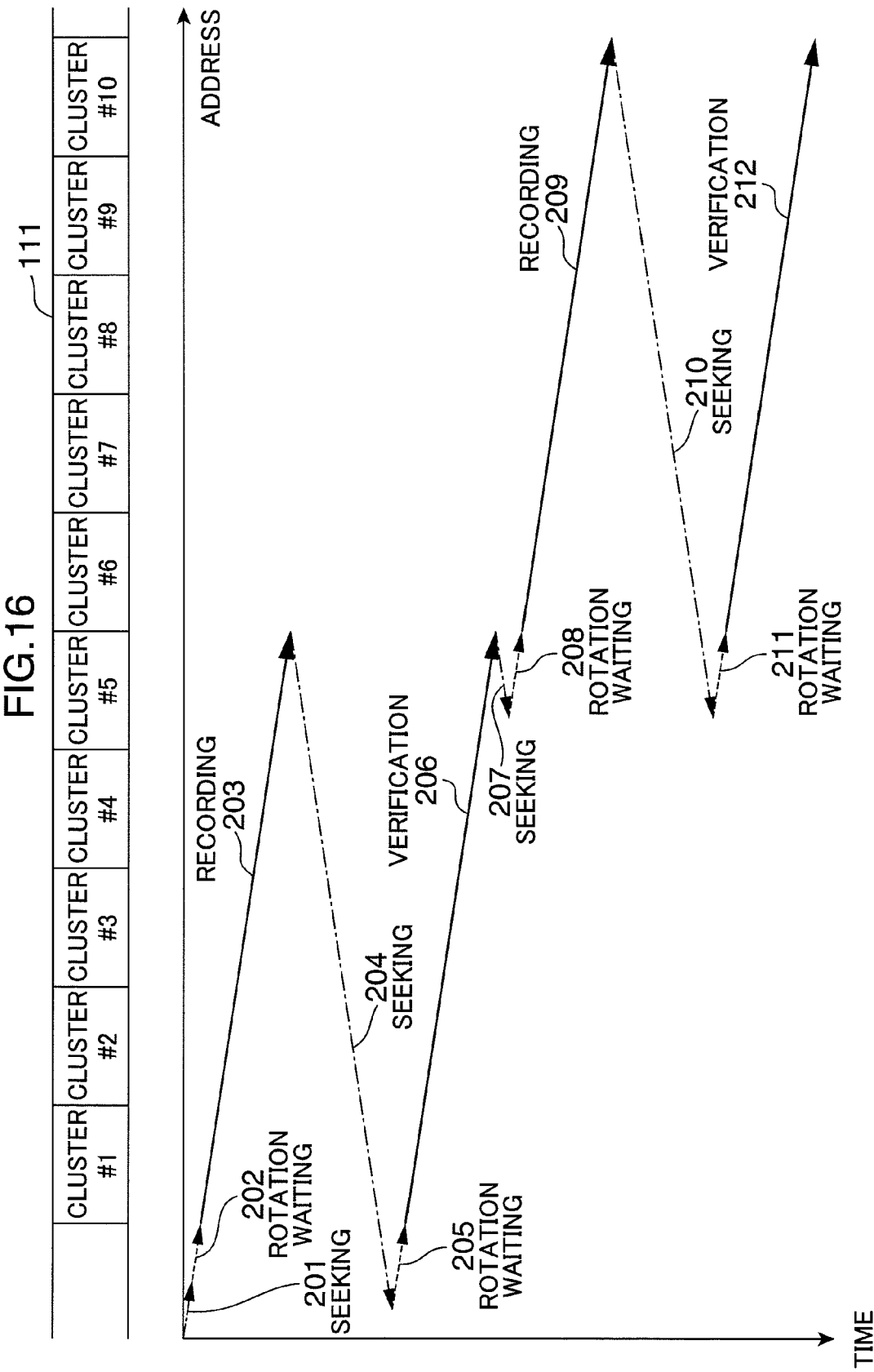
FIG. 16 is a chart showing an operation of the conventional information recording apparatus in chronological order in the case of performing the write and verify processing.
Figure 17:
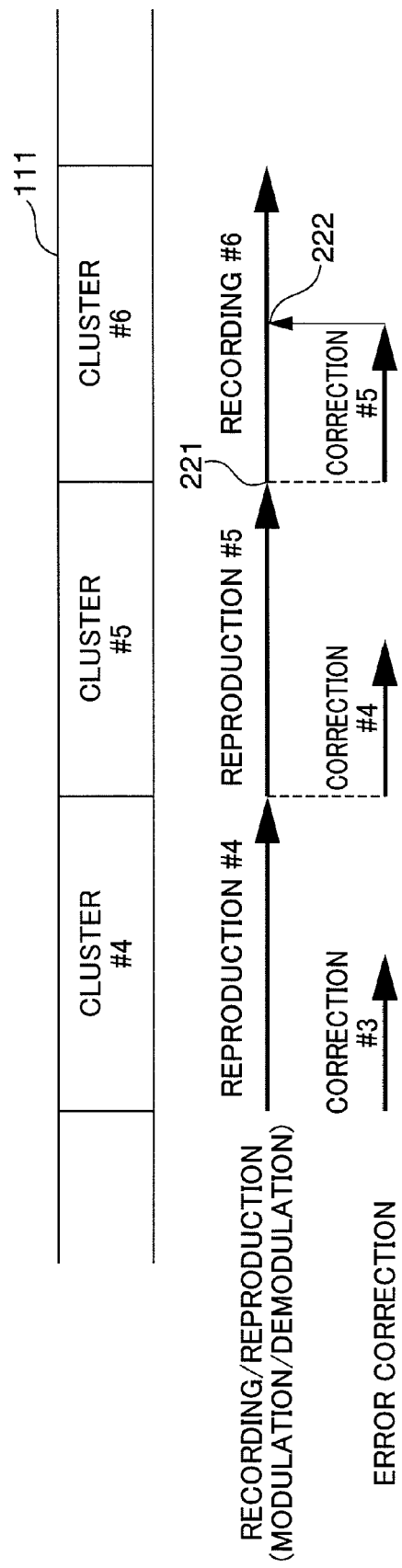
FIG. 17 is a chart showing a switch between verification and recording in the conventional information recording apparatus.

Since the disc motor 12, the optical pickup 13, the servo controller 14, the buffer memory 15, the host interface 16, the modem 19 and the error correction coder 20 respectively have the same constructions as the disc motor 112, the optical pickup 113, the servo controller 114, the buffer memory 115, the host interface 116, the modem 119 and the error correction coder 120 shown in FIG. 14, they are not described.

The recording/reproduction controller 21 includes a recording controller 31, a verification controller 32 and a continuous recording controller 33. The drive controller 22 includes an error region discriminator 23 and an error processor 24.

The recording controller 31 controls the optical pickup 13, the modem 19 and the error correction coder 20 to record data on an optical disc 11. The verification controller 32 controls the optical pickup 13, the modem 19 and the error correction coder 20 to confirm (verify) whether or not the data recorded by the recording controller 31 can be correctly reproduced.

The continuous recording controller 33 controls the optical pickup 13, the modem 19 and the error correction coder 20 such that a region (gap region) of a specified interval is provided between a verification region to be verified by the verification controller 32 and a recording region to have data recorded therein by the recording controller 31 and a verify processing and a record processing are successively performed with rotation waiting in between.

Specifically, the continuous recording controller 33 controls the optical pickup 13, the modem 19 and the error correction coder 20 such that rotation is waited for in the gap region after the verification region is verified and data is recorded in the recording region after the optical pickup 13 passes the gap region. In this embodiment, the recording controller 31 corresponds to an example of a recorder, the verification controller 32 to an example of a verifier and the continuous recording controller 33 to an example of a continuous recorder.

The error region discriminator 23 discriminates which of the verification region, the gap region and the recording region is an error region where an error occurred. The error processor 24 performs an error processing suitable for the error region discriminated by the error region discriminator 23. When the gap region is discriminated to be the error region by the error region discriminator 23, the error processor 24 performs an error processing different from the one performed when the error is discriminated to have occurred in either one of the verification region and the recording region.

The error processor 24 performs an error processing including a defect replacement processing for recording data to be recorded in a spare region when the error is discriminated to have occurred in either one of the verification region and the recording region by the error region discriminator 23 and performs an error processing including no defect replacement processing when the error is discriminated to have occurred in the gap region by the error region discriminator 23.

Figure 2:
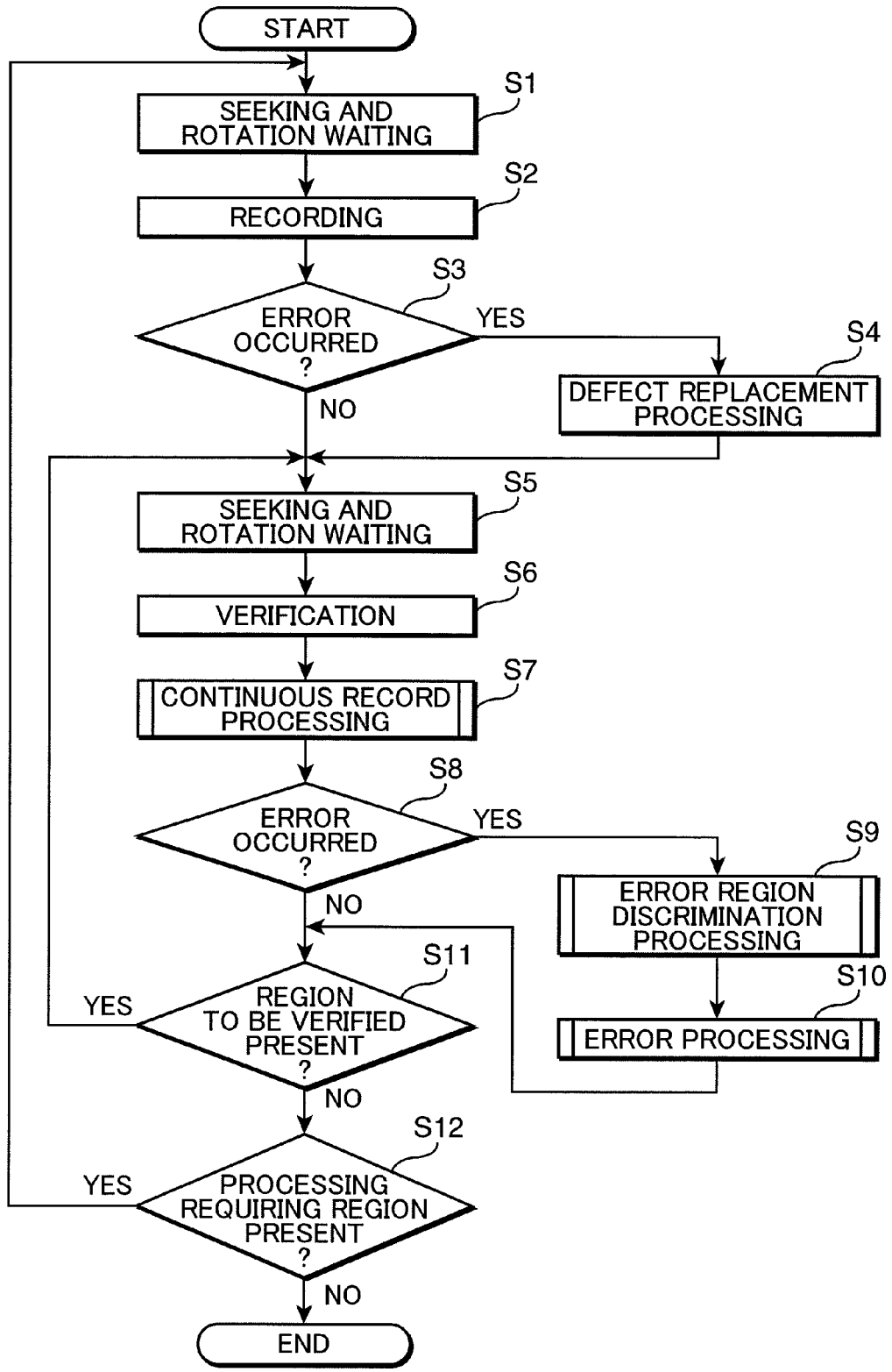
FIG. 2 is a flow chart showing an exemplary write and verify processing in the information recording apparatus according to the embodiment of the invention.

FIG. 2 is a flow chart showing an exemplary write and verify processing in the information recording apparatus 1 according to the embodiment of the present invention.

First of all, in Step S1, the drive controller 22 instructs the servo controller 14 to move the optical pickup 13 to a position before a region to be recorded. The servo controller 14 controls the optical pickup 13 to move the optical pickup 13 to the position before the region to be recorded and waits on standby (rotation waiting) until the optical pickup 13 reaches the region to be recorded.

The drive controller 22 issues a record command designating a record processing sector number, which is the number of sectors to which a record processing is to be performed, to the recording/reproducing unit 18. Upon the issuance of the record command, the recording/reproduction controller 21 reads data stored in the buffer memory 15 to be recorded to the error correction coder 20. The error correction coder 20 codes the read data to generate coded data and outputs it to the modem 19. The modem 19 modulates the coded data to generate recording data.

Subsequently, in Step S2, the recording controller 31 controls the optical pickup 13 to irradiate the optical disc 11 with a laser beam, thereby recording the recording data on the optical disc 11, when the optical pickup 13 reaches the region to be recorded. The recording/reproduction controller 21 returns a recording result as a status to the drive controller 22.

Subsequently, in Step S3, the drive controller 22 discriminates based on the status transmitted from the recording/reproduction controller 21 whether or not an error occurred during the execution of the record command. If the error is judged to have occurred (YES in Step S3), a processing of Step S4 follows. On the other hand, if no error occurrence is judged (NO in Step S3), a processing of Step S5 follows.

Subsequently, in Step S4, the drive controller 22 controls the recording/reproducing unit 18 to perform a defect replacement processing for recording the data stored in the buffer memory 15 and to be recorded in the error region in the spare region. The processing of Step S4 corresponds to an error processing in the recording region (recording error processing).

Subsequently, in Step S5, the drive controller 22 instructs the servo controller 14 to move the optical pickup 13 to the position before the region to be verified. The servo controller 14 controls the optical pickup 13 to move the optical pickup 13 to the position before the region to be verified and waits on standby (rotation waiting) until the optical pickup 13 reaches the region to be verified.

The drive controller 22 issues a verify command designating a verify processing sector number, which is the number of sectors to which a verify processing is to be performed, a record processing sector number, which is the number of sectors to which the record processing is to be performed, and a gap sector number, which is the number of sectors in the gap region, to the recording/reproducing unit 18.

Subsequently, in Step S6, the verification controller 32 controls the optical pickup 13, the modem 19 and the error correction coder 20 for verification when the optical pickup 13 reaches the region to be verified. The verification controller 32 controls the optical pickup 13, the modem 19 and the error correction coder 20 to irradiate the optical disc 11 with a laser beam, thereby reproducing data from the optical disc 11, when the optical pickup 13 reaches the region to be verified. The modem 19 demodulates the reproduced data to generate demodulated data and the error correction coder 20 performs an error correction to the demodulated data and stores it in the buffer memory 15.

In the case of performing the record processing successively after the verify processing, the continuous recording controller 33 controls the optical pickup 13, the modem 19 and the error correction coder 20 in Step S7 such that the gap region is provided between the verification region and the recording region and the verify processing and the record processing are successively performed. A continuous record processing in Step S7 is described in detail later.

Subsequently, in Step S8, the drive controller 22 discriminates whether or not an error has occurred during the execution of the verify command. If the error is judged to have occurred (YES in Step S8), a processing of Step S9 follows. On the other hand, if no error occurrence is judged (NO in Step S8), a processing of Step S11 follows.

Subsequently, in Step S9, the error region discriminator 23 discriminates which of the verification region, the gap region and the recording region is the error region. An error region discrimination processing in Step S9 is described in detail later.

Subsequently, in Step S10, the error processor 24 performs an error processing suitable for the error region based on the discrimination result of the error region discriminator 23. The error processing in Step S10 is described in detail later.

Subsequently, in Step S11, the drive controller 22 discriminates whether or not there is any region to be verified. If the region to be verified is judged to be present (YES in Step S11), the processing of Step S5 follows. On the other hand, if the region to be verified is judged to be absent (NO in Step S11), a processing of Step S12 follows.

Subsequently, in Step S12, the drive controller 22 discriminates whether or not there is any processing requiring region to which the write and verify processing should be performed. If the processing requiring region is judged to be present (YES in Step S12), the processing of Step S1 follows. On the other hand, if the processing requiring region is judged to be absent (NO in Step S12), this routine ends.

Figure 3:
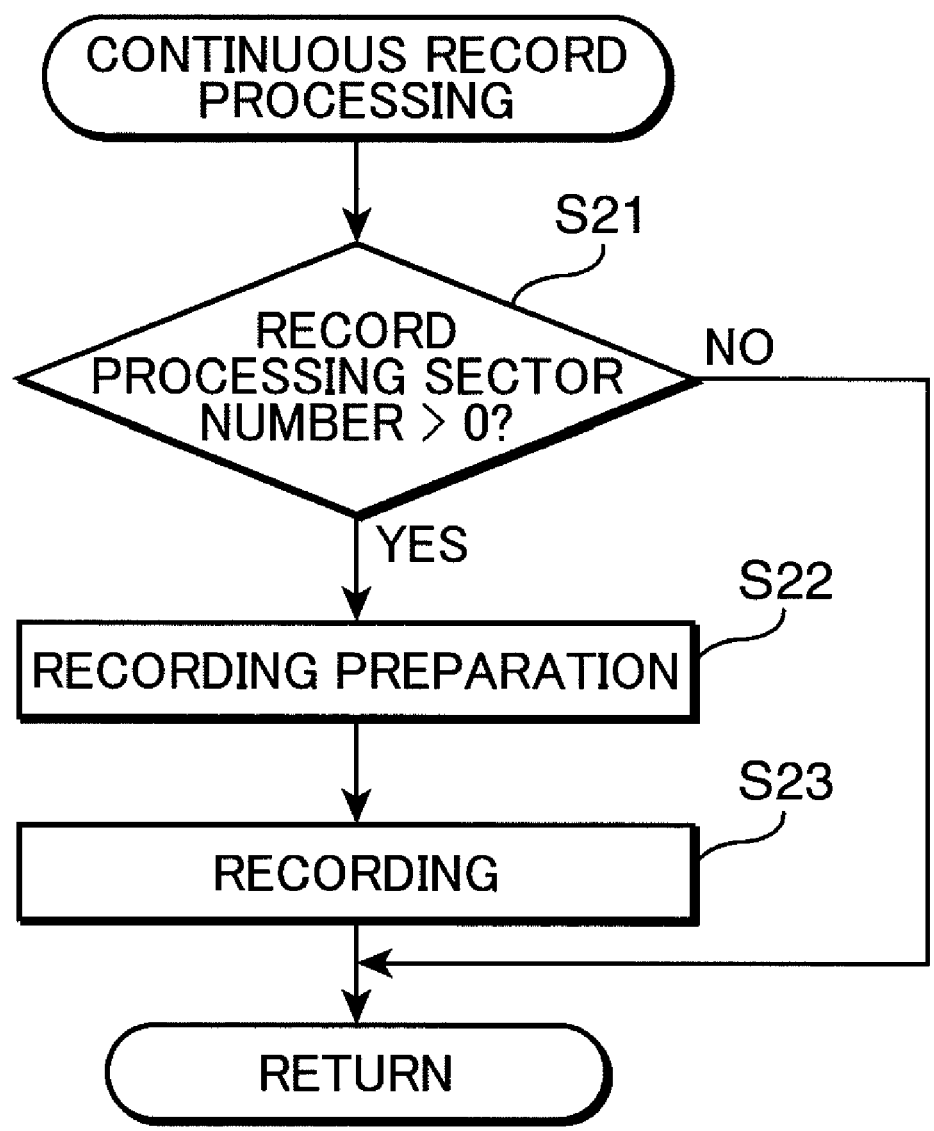
FIG. 3 is a flow chart showing an exemplary continuous record processing in Step S7 of FIG. 2.

FIG. 3 is a flow chart showing an exemplary continuous record processing in Step S7 of FIG. 2.

First of all, in Step S21, the continuous recording controller 33 discriminates whether or not the record processing sector number designated by the drive controller 22 is larger than 0 in order to discriminate whether or not to continuously record. If the record processing sector number is larger than 0, i.e. if it is judged to continuously record (YES in Step S21), a processing of Step S22 follows. On the other hand, if the record processing sector number is 0, i.e. if it is judged not to continuously record (NO in Step S21), this routine ends.

Subsequently, in Step S22, the continuous recording controller 33 performs the recording preparation such as switching of the modem 19 and the error correction coder 20 and the generation of coded and modulated recording data until the optical pickup 13 reaches the region to be recorded.

Subsequently, in Step S23, the continuous recording controller 33 controls the optical pickup 13 to irradiate the optical disc 11 with a laser beam, thereby recording the recording data on the optical disc 11, when the optical pickup 13 reaches the region to be recorded.

In this embodiment, the record processing sector number is used to discriminate whether or not to continuously record in Step S21. However, the present invention is not limited to this and it is sufficient to discriminate whether or not to continuously record. For example, a record processing cluster number may be used instead of the record processing sector number. Further, the drive controller 22 may issue a verify command while designating a continuous recording execution bit and the continuous recording controller 33 may discriminate whether or not to continuously record based on whether or not the continuous recording execution bit has been designated. Furthermore, the drive controller 22 may designate a recording start PBA indicating a physical address (PBA) of the leading cluster to be recorded and the continuous recording controller 33 may discriminate whether or not to continuously record based on whether or not the recording start PBA has been designated.

Although whether or not to continuously record is discriminated after the completion of the verification, it may be discriminated before the verification.

Further, whether or not to continuously record is discriminated before the verification and data to be recorded may be coded and modulated while the error correction coder 20 and the modem 19 are performing neither error correction nor modulation during the verification. This can further shorten the cluster number (interval) of the gap region.

Figure 4:
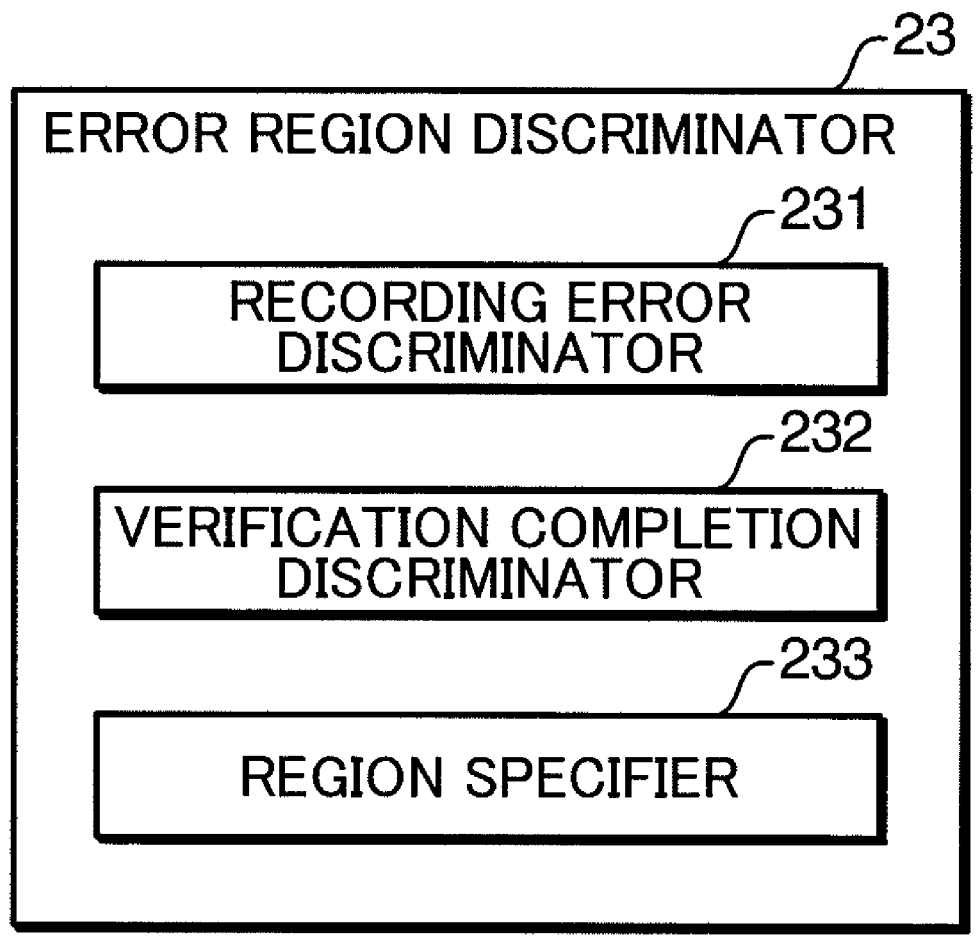
FIG. 4 is a diagram showing the construction of an error region discriminator in the embodiment.

FIG. 4 is a diagram showing the construction of the error region discriminator 23 according to this embodiment. The error region discriminator 23 includes a recording error discriminator 231, a verification completion discriminator 232 and a region specifier 233.

The recording error discriminator 231 discriminates based on information indicating an error occurrence in the recording region transmitted from the continuous recording controller 33 whether or not an error has occurred in the recording region. The verification completion discriminator 232 discriminates based on information indicating degrees of completion of the verify processing and the record processing transmitted from the continuous recording controller 33 whether or not the verification of the data recorded in the verification region has been completed. The region specifier 233 specifies the error region based on the discrimination results of the recording error discriminator 231 and the verification completion discriminator 232.

Figure 5:
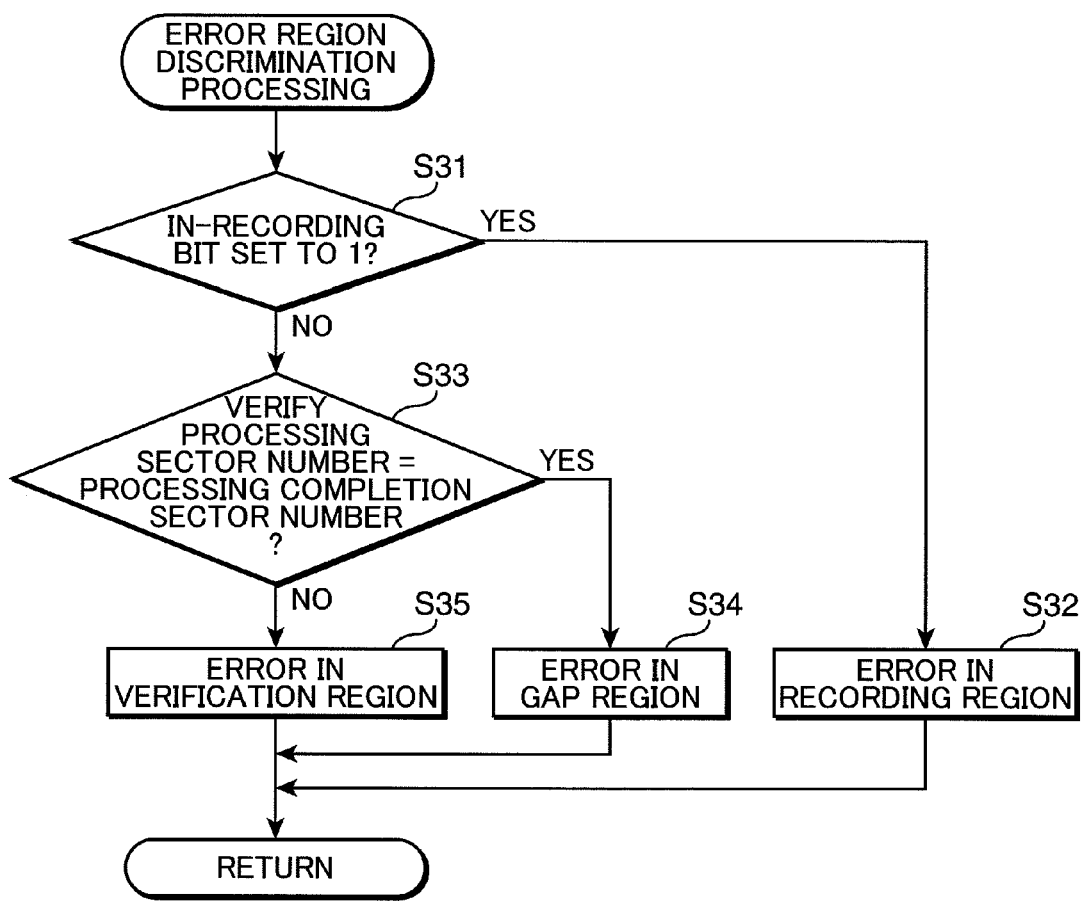
FIG. 5 is a flow chart showing an exemplary error region discrimination processing in Step S9 of FIG. 2.

FIG. 5 is a flow chart showing an exemplary error region discrimination processing in Step S9 of FIG. 2.

Here, if the continuous recording controller 33 provides the gap region between the verification region and the recording region and successively performs the verify processing and the record processing, the continuous recording controller 33 sets a in-recording bit to 1 in a status and returns it to the drive controller 22 if an error occurs during the record processing. Further, the continuous recording controller 33 also returns a processing completion sector number, which indicates the number of sectors where the verify processing and the record processing have been completed, to the drive controller 22.

First of all, in Step S31, the recording error discriminator 231 discriminates whether or not the status being returned from the continuous recording controller 33 includes the in-recording bit set to 1. If the in-recording bit is judged to be set to 1 (YES in Step S31), a processing of Step S32 follows. On the other hand, if the in-recording bit is judged not to be set to 1 (NO in Step S31), a processing of Step S33 follows.

Subsequently, in Step S32, the region specifier 233 determines an error occurrence in the recording region.

Subsequently, in Step S33, the verification completion discriminator 232 discriminates whether or not the verify processing sector number designated to the recording/reproducing unit 18 and the processing completion sector number returned from the continuous recording controller 33 are equal. If the verify processing sector number and the processing completion sector number are judged to be equal (YES in Step S33), a processing of Step S34 follows. On the other hand, if the verify processing sector number and the processing completion sector number are judged to be different (NO in Step S33), a processing of Step S35 follows. Here, since the error region is judged to be the verification region or the gap region in Step S31, the processing completion sector number is equal to the number of sectors where the verification has been completed.

Subsequently, in Step S34, the region specifier 233 determines an error occurrence in the gap region since the verify processing sector number and the processing completion sector number are equal, i.e. the verification has been normally completed.

Subsequently, in Step S35, the region specifier 233 determines an error occurrence in the verification region since the verify processing sector number and the processing completion sector number are not equal, i.e. the verification has not been normally completed.

Although the in-recording bit is set to 1 in a status in the event an error during the record processing in this embodiment, any information enabling the discrimination as to whether or not an error occurred during the record processing can be used and information indicating an error occurrence in the recording region may be returned to the drive controller 22 separately from the status.

Further, although the continuous recording controller 33 returns the processing completion sector number indicating the number of sectors where the verify processing and the record processing have been completed, a verification completion sector number indicating the number of sectors where the verify processing has been completed and a recording completion sector number indicating the number of sectors where the record processing has been completed may be returned and it may be discriminated whether or not the verification completion sector number and the verify processing sector number are equal. Further, a processing completion cluster number may be used instead of the processing completion sector number.

The error region is uniquely determined by the discrimination of the in-recording bit in Step S31 and the comparison of the verify processing sector number and the processing completion sector number in Step S33. Thus, it does not matter which of the processing of Step S31 and that of Step S33 is performed earlier than the other.

Next, an error region discrimination processing according to a first modification of the embodiment is described.

Figure 6:
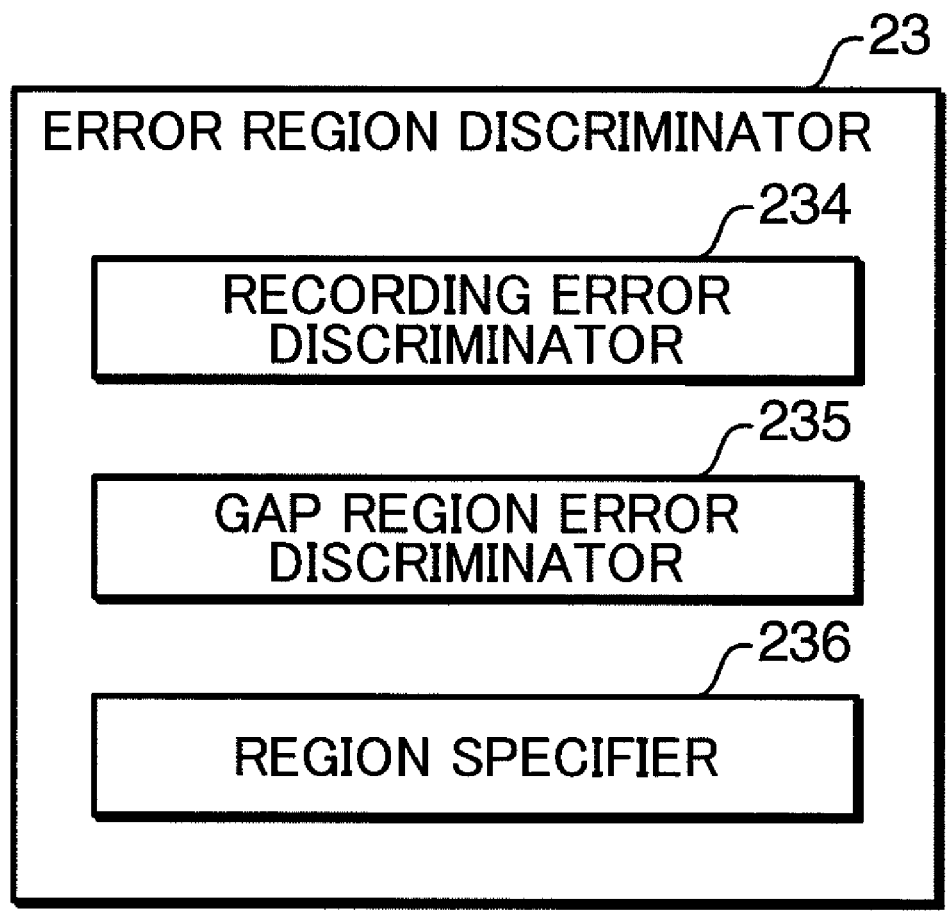
FIG. 6 is a diagram showing the construction of an error region discriminator according to a first modification of the embodiment.

FIG. 6 is a diagram showing the construction of an error region discriminator 23 according to the first modification of this embodiment. The error region discriminator 23 includes a recording error discriminator 234, a gap region error discriminator 235 and a region specifier 236.

The recording error discriminator 234 discriminates based on information indicating an error occurrence in the recording region transmitted from the continuous recording controller 33 whether or not an error has occurred in the recording region. The gap region error discriminator 235 discriminates based on information indicating an error occurrence in the gap region transmitted from the continuous recording controller 33 whether or not an error has occurred in the gap region. The region specifier 236 specifies an error region based on the discrimination results of the recording error discriminator 234 and the gap region error discriminator 235.

Figure 7:
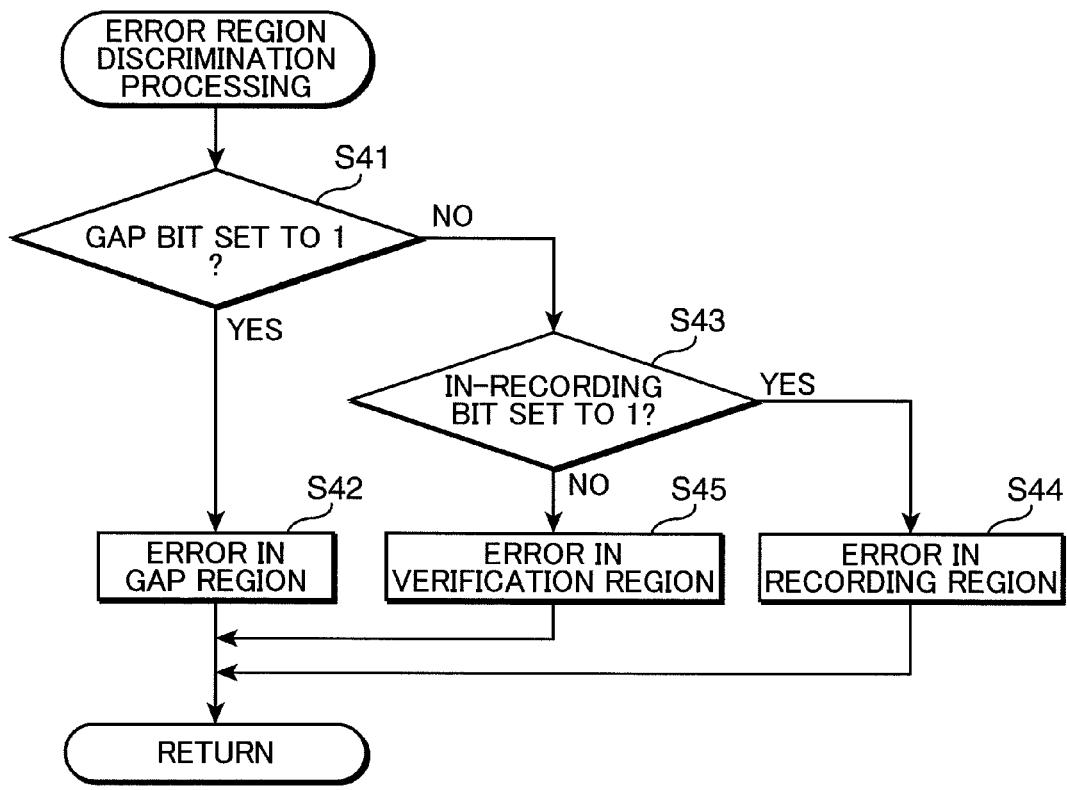
FIG. 7 is a flow chart showing an exemplary error region discrimination processing according to a first modification of the embodiment.

FIG. 7 is a flow chart showing an exemplary error region discrimination processing according to the first modification of this embodiment. The error region discrimination processing shown in FIG. 7 is the processing performed in Step S9 of FIG. 2. Processings other than the error region discrimination processing in the first modification of this embodiment are the same as those in Steps S1 to S8, S10 to S12 of FIG. 2.

Here, if the continuous recording controller 33 provides the gap region between the verification region and the recording region and successively performs the verify processing and the record processing, the continuous recording controller 33 sets a gap bit to 1 in a status if an error occurs in the gap region and returns it to the drive controller 22 while setting an in-recording bit to 1 in a status and returns it to the drive controller 22 if an error occurs during the recording processing.

First of all, in Step S41, the gap region error discriminator 235 discriminates whether or not the gap bit is set to 1 in the status returned from the continuous recording controller 33. If the gap bit is judged to be set to 1 (YES in Step S41), a processing of Step S42 follows. On the other hand, if the gap bit is judged not to be set to 1 (NO in Step S41), a processing of Step S43 follows.

Subsequently, in Step S42, the region specifier 236 determines the error occurrence in the gap region.

Subsequently, in Step S43, the recording error discriminator 234 discriminates whether or not the in-recording bit is set to 1 in the status returned from the continuous recording controller 33. If the in-recording bit is judged to be set to 1 (YES in Step S43), a processing of Step S44 follows. On the other hand, if the in-recording bit is judged not to be set to 1 (NO in Step S43), a processing of Step S45 follows.

Subsequently, in Step S44, the region specifier 236 determines the error occurrence in the recording region.

Subsequently, in Step S45, the region specifier 236 determines the error occurrence in the verification region.

Although the gap bit is set to 1 in the status when an error occurred in the gap region and the in-recording bit is set to 1 in the status when an error occurred during the record processing, any information indicating an error occurrence in the gap region or the recording region is sufficient. Information indicating an error occurrence in the gap region or information indicating an error occurrence in the recording region may be returned to the drive controller 22 separately from the status.

Although the error region discrimination processing is performed using the gap bit and the in-recording bit in the first modification of this embodiment, it is sufficient to be able to discriminate whether or not errors have occurred in any two of the verification region, the gap region and the recording region. For example, the error region discrimination processing may be performed using an in-verification bit indicating an error occurrence during the verify processing and a gap bit or may be performed using an in-verification bit and an in-recording bit.

The error region is uniquely determined by the discrimination of the gap bit in Step S41 and that of the in-recording bit in Step S43. Thus, it does not matter which of the processing of Step S41 and that of Step S43 is performed earlier than the other.

Next, an error region discrimination processing according to a second modification of the embodiment is described.

Figure 8:
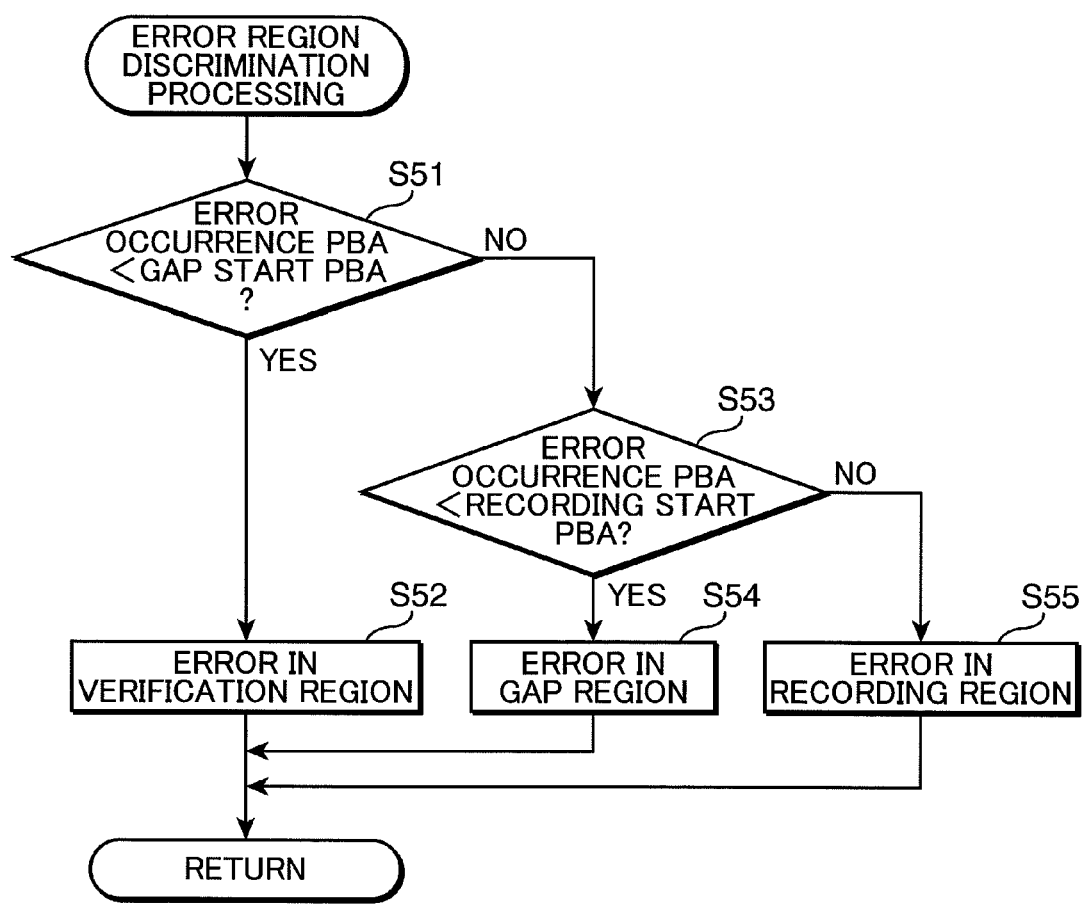
FIG. 8 is a flow chart showing an exemplary error region discrimination processing according to a second modification of the embodiment.

FIG. 8 is a flow chart showing an exemplary error region discrimination processing according to the second modification of the embodiment. The error region discrimination processing shown in FIG. 8 is the processing performed in Step S9 of FIG. 2. Processings other than the error region discrimination processing in the second modification of the embodiment are the same as those in Steps S1 to S8, S10 to S12 of FIG. 2.

Here, the continuous recording controller 33 returns an error occurrence PBA indicating a physical address (PBA) of an error region to the drive controller 22 when an error occurred. The error region discriminator 23 discriminates an error region based on an address of the error region, that of the recording region and that of the gap region transmitted from the continuous recording controller 33.

First of all, in Step S51, the error region discriminator 23 discriminates whether or not the error occurrence PBA is smaller than a gap start PBA indicating a physical address of the leading cluster of the gap region. If the error occurrence PBA is judged to be smaller than the gap start PBA (YES in Step S51), a processing of Step S52 follows. On the other hand, if the error occurrence PBA is judged to be equal to or larger than the gap start PBA (NO in Step S51), a processing of Step S53 follows.

If the error occurrence PBA is smaller than the gap start PBA, i.e. if the error occurred in the region before the gap region, the error region discriminator 23 determines the error occurrence in the verification region in Step S52.

Subsequently, in Step S53, the error region discriminator 23 discriminates whether or not the error occurrence PBA is smaller than a recording start PBA indicating a physical address (PBA) of the leading cluster for recording. If the error occurrence PBA is judged to be smaller than the recording start PBA (YES in Step S53), a processing of Step S54 follows. On the other hand, if the error occurrence PBA is judged to be equal to or larger than the recording start PBA (NO in Step S53), a processing of Step S55 follows.

If the error occurrence PBA is smaller than the recording start PBA, i.e. if the error occurred in the gap region before the recording region, the error region discriminator 23 determines the error occurrence in the gap region in Step S54.

Subsequently, in Step S55, the error region discriminator 23 determines the error occurrence in the recording region.

Although the error region discrimination processing is performed using the gap start PBA in Step S51 and the recording start PBA in Step S53, it may be performed using a verification end PBA indicating a physical address (PBA) of an end cluster of the verification region in Step S51 and a gap end PBA indicating a physical address (PBA) of an end cluster of the gap region in Step S53.

Although the error region discrimination processing is performed using the physical addresses in the second modification of the embodiment, it may be performed using logical addresses.

The error region is uniquely determined by the comparison of the error occurrence PBA and the gap start PBA in Step S51 and the comparison of the error occurrence PBA and the recording start PBA in Step S53. Thus, it does not matter which of the processing of Step S51 and that of Step S53 is performed earlier than the other.

Next, an error region discrimination processing according to a third modification of the embodiment is described.

Figure 9:
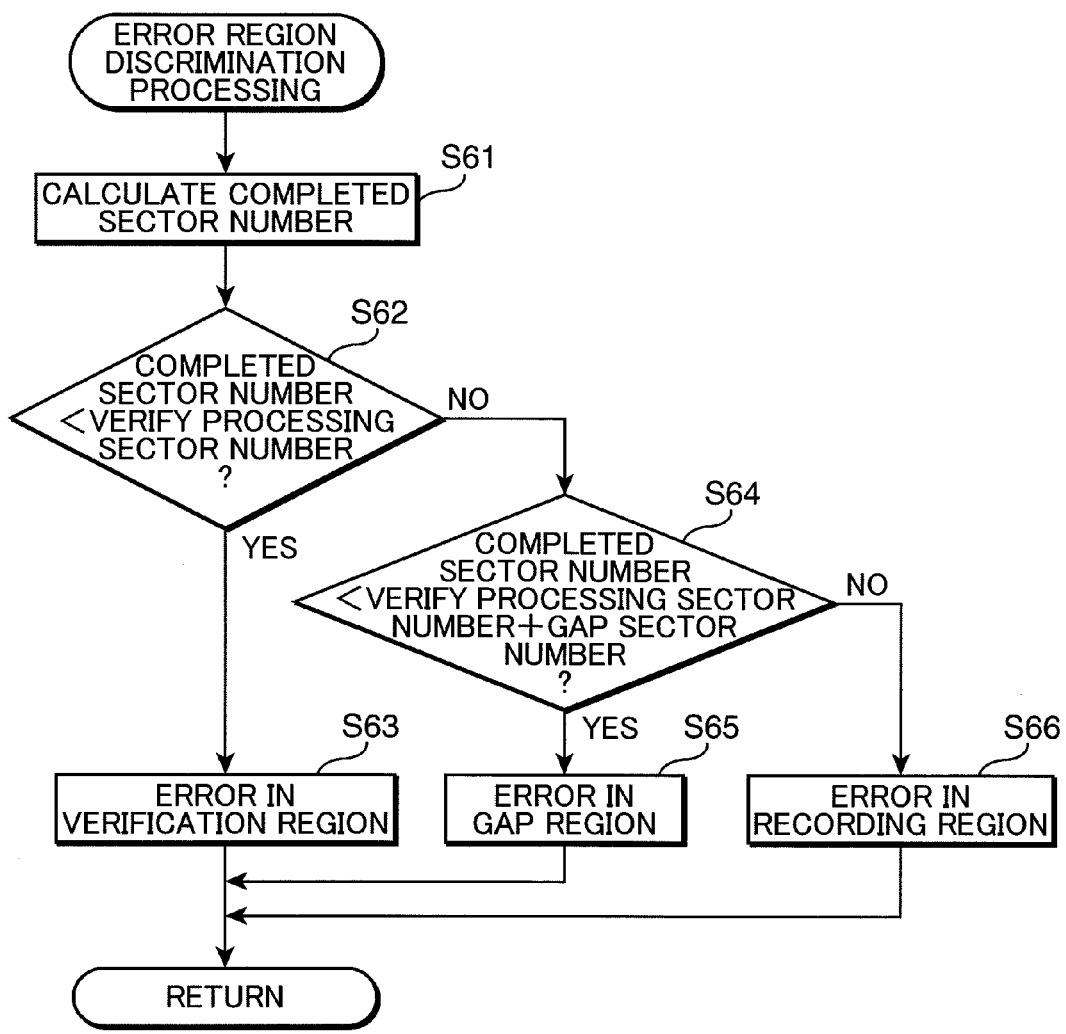
FIG. 9 is a flow chart showing an exemplary error region discrimination processing according to a third modification of the embodiment.

FIG. 9 is a flow chart showing an exemplary error region discrimination processing according to the third modification of this embodiment. The error region discrimination processing shown in FIG. 9 is the processing performed in Step S9 of FIG. 2. Processings other than the error region discrimination processing in the third modification of the embodiment are the same as those in Steps S1 to S8, S10 to S12 of FIG. 2.

Here, the continuous recording controller 33 returns a status to the drive controller 22 for each cluster as a data recording unit. In other words, the continuous recording controller 33 returns the status to the drive controller 22 during the verify processing, the gap region passage and the record processing. The error region discriminator 23 discriminates an error region based on the number of sectors in a region where the processing has been completed, the number of sectors in the verification region and the number of sectors in the gap region, which numbers are transmitted by the continuous recording controller 33.

First of all, in Step S61, the error region discriminator 23 counts the number of statuses returned from the continuous recording controller 33 and calculates a completed sector number indicating the number of sectors completed during the execution of a command. The error region discriminator 23 calculates the completed sector number from the start of the verify processing to the end of the record processing.

Subsequently, in Step S62, the error region discriminator 23 discriminates whether or not the completed sector number calculated in Step S61 is smaller than a verify processing sector number indicating the number of sectors to which the verify processing instructed to the recording/reproducing unit 18 is performed. If the completed sector number is judged to be smaller than the verify processing sector number (YES in Step S62), a processing of Step S63 follows. On the other hand, if the completed sector number is judged to be equal to or larger than the verify processing sector number (NO in Step S62), a processing of Step S64 follows.

If the completed sector number is smaller than the verify processing sector number, i.e. if an error occurred during the verify processing, the error region discriminator 23 determines the error occurrence in the verification region in Step S63.

Subsequently, in Step S64, the error region discriminator 23 discriminates whether or not the completed sector number is smaller than the sum of the verify processing sector number and a gap sector number indicating the number of sectors in the gap region. If the completed sector number is judged to be smaller than the sum of the verify processing sector number and the gap sector number (YES in Step S64), a processing of Step S65 follows. On the other hand, if the completed sector number is judged to be equal to or larger than the sum of the verify processing sector number and the gap sector number (NO in Step S64), a processing of Step S66 follows.

If the completed sector number is judged to be smaller than the sum of the verify processing sector number and the gap sector number, i.e. if an error occurred while the optical pickup 13 was passing the gap region, the error region discriminator 23 determines the error occurrence in the gap region in Step S65.

Subsequently, in Step S66, the error region discriminator 23 determines the error occurrence in the recording region.

The error region is uniquely determined by the comparison of the completed sector number and the verify processing sector number in Step S62 and the comparison of the completed sector number and the sum of the verify processing sector number and the gap sector number in Step S64. Thus, it does not matter which of the processing of Step S62 and that of Step S64 is performed earlier than the other.

Next, the error processing in this embodiment is described.

Figure 10:
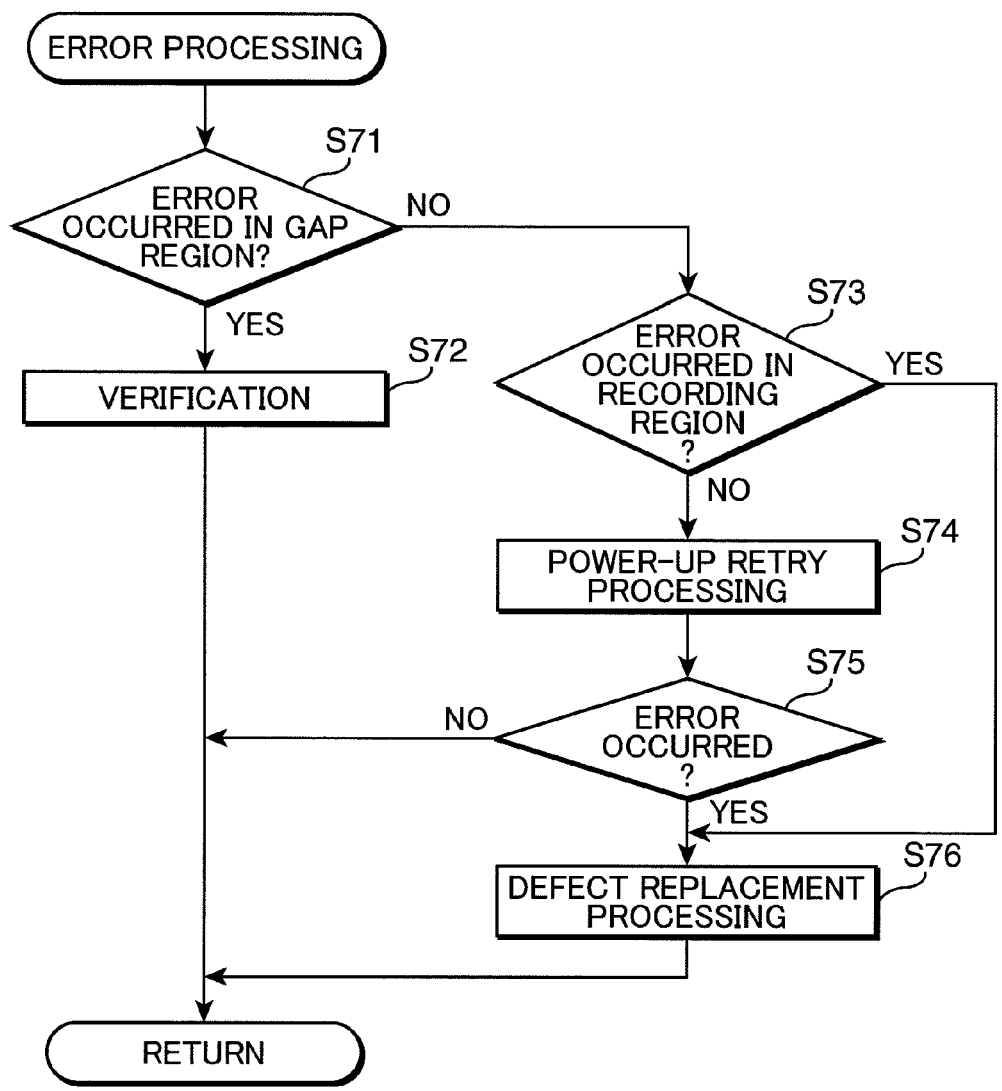
FIG. 10 is a flow chart showing an exemplary error processing performed according to an error region in Step S10 of FIG. 2.

FIG. 10 is a flow chart showing an exemplary error processing performed according to the error region in Step S10 of FIG. 2.

First of all, in Step S71, the error processor 24 discriminates based on the discrimination result of the error region discriminator 23 whether or not an error occurred in the gap region. If the error is judged to have occurred in the gap region (YES in Step S71), a processing of Step S72 follows. On the other hand, if no error occurrence is judged in the gap region (NO in Step S71), a processing of Step S73 follows.

Subsequently, in Step S72, the error processor 24 controls the recording/reproducing unit 18 to verify the gap region where the error occurred.

Subsequently, in Step S73, the error processor 24 discriminates based on the discrimination result of the error region discriminator 23 whether or not an error occurred in the recording region. If the error is judged to have occurred in the recording region (YES in Step S73), a processing of Step S76 follows. On the other hand, if no error occurrence is judged in the recording region (NO in Step S73), a processing of Step S74 follows.

If no error occurred in the gap region and the recording region, i.e. if an error occurred in the verification region, the error processor 24 controls the recording/reproducing unit 18 to perform a power-up retry processing for performing the record processing and the verify processing to the verification region where the error occurred with the recording power changed in Step S74.

Subsequently, in Step S75, the error processor 24 discriminates based on the status returned from the continuous recording controller 33 whether or not an error occurred during the power-up retry processing. If the error is judged to have occurred (YES in Step S75), a processing of Step S76 follows. On the other hand, if no error occurrence is judged (NO in Step S75), this routine ends.

Subsequently, in Step S76, the error processor 24 controls the recording/reproducing unit 18 to perform a defect replacement processing for recording the data stored in the buffer memory 15 and to be recorded in the error region in the spare region.

Accordingly, the processing of Step S72 corresponds to the error processing in the gap region (gap error processing), those of Steps S74 to S76 correspond to the error processing in the verification region (verification error processing) and that of Step S76 corresponds to the error processing in the recording region (recording error processing).

Figure 11:
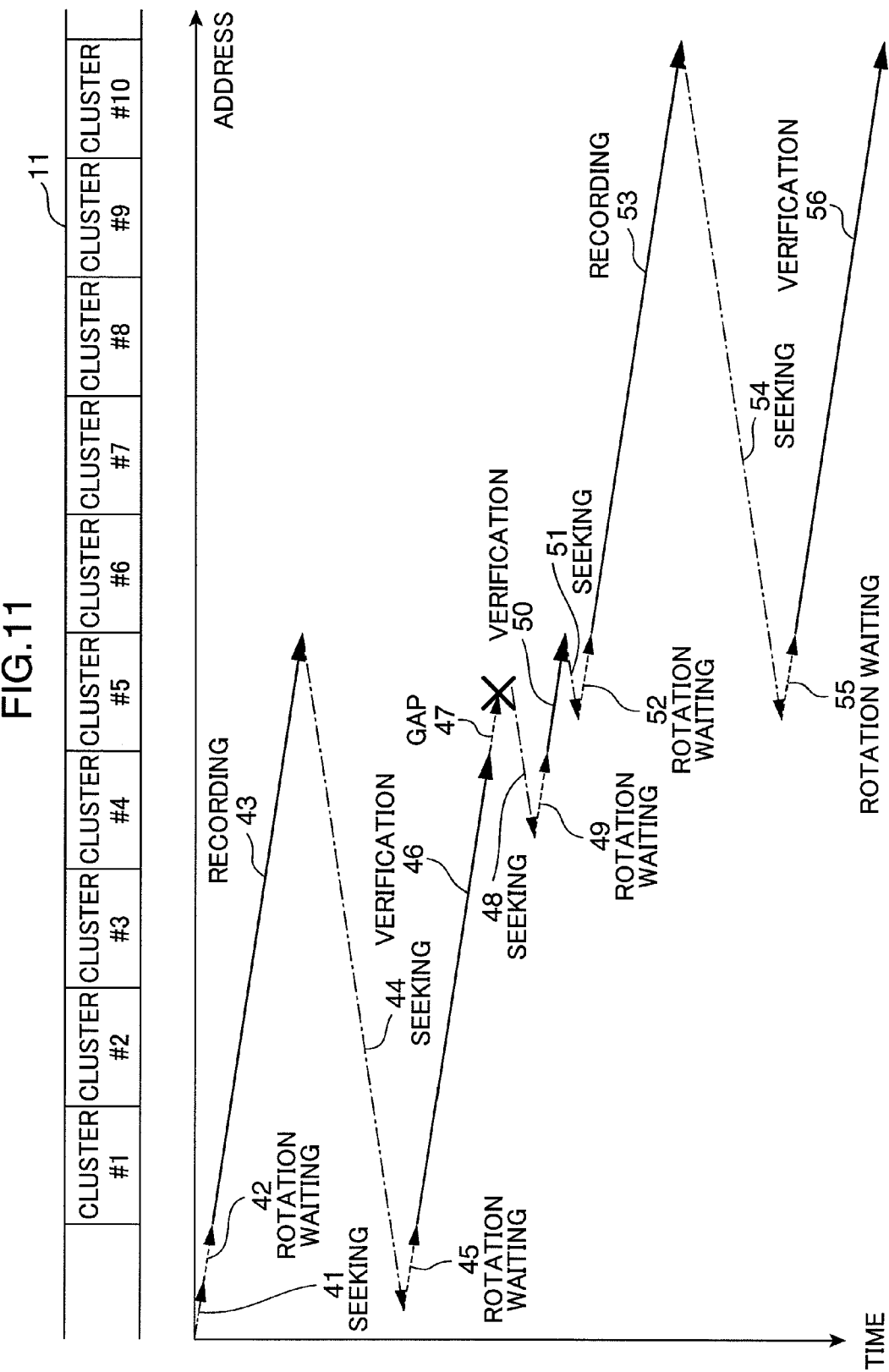
FIG. 11 is a chart showing an operation of the information recording apparatus in chronological order when an error occurred in a gap region.

FIG. 11 is a chart showing an operation of the information recording apparatus 1 in chronological order when an error occurred in the gap region.

As shown in FIG. 11, when an error occurred in a gap region 47, a seeking motion 48 and a rotation waiting motion 49 are performed to verify the gap region 47 (verification region 50). Thereafter, a seeking motion 51 and a rotation waiting motion 52 in Step S1 of FIG. 2 are performed to a region following the gap region 47.

As described above, according to the write and verify processing of this embodiment, the gap region is provided between the verification region and the recording region and the processing for successively performing the verify processing and the record processing is performed by one command, whereby a time required for the command issuance can be shortened.

By determining which of the verification region, the gap region and the recording region is the error region, the error processing suitable for the error region can be performed.

Since the unnecessary retry processing and defect replacement processing are not performed when an error occurred in the gap region, a recording time can be shortened.

Further, by performing no unnecessary defect replacement processing when an error occurred in the gap region and performing an error processing suitable at the time of a verification error when an error occurred in the verification region, the defect replacement processing due to the verification error can be reduced and the occurrence of a recording error can be prevented.

Although the write and verify processing for the rewritable optical disc is described in this embodiment, application to recordable optical discs is also possible if no power-up retry processing (Steps S74 and S75 of FIG. 10) as the error processing in the verification region is performed. In this case, it is sufficient for the error region discriminator 23 to discriminate whether or not an error occurred in the gap region since the error processings in the verification region and the recording region are same.

Although the error processing during the verification is comprised of the power-up retry processing and the defect replacement processing, any processing may be performed which can guarantee correct reproduction. For example, verification may be performed a specified number of times. For example, verification may be performed with the number of retries, hardware parameters and the like set to be same as those of normal reproduction.

In Step S72 of FIG. 10, the gap region is verified as the error processing in the gap region. However, if the error is judged to have occurred in the gap region in Step S71 of FIG. 10, the presence of the region to be verified is judged in Step S11 by directly proceeding to Step S11 (FIG. 2) without performing anything, and verification is performed in Step S26. Thus, if the error is judged to have occurred in the gap region in Step S71 of FIG. 10, the error processing may be ended without performing any processing.

Figure 12:
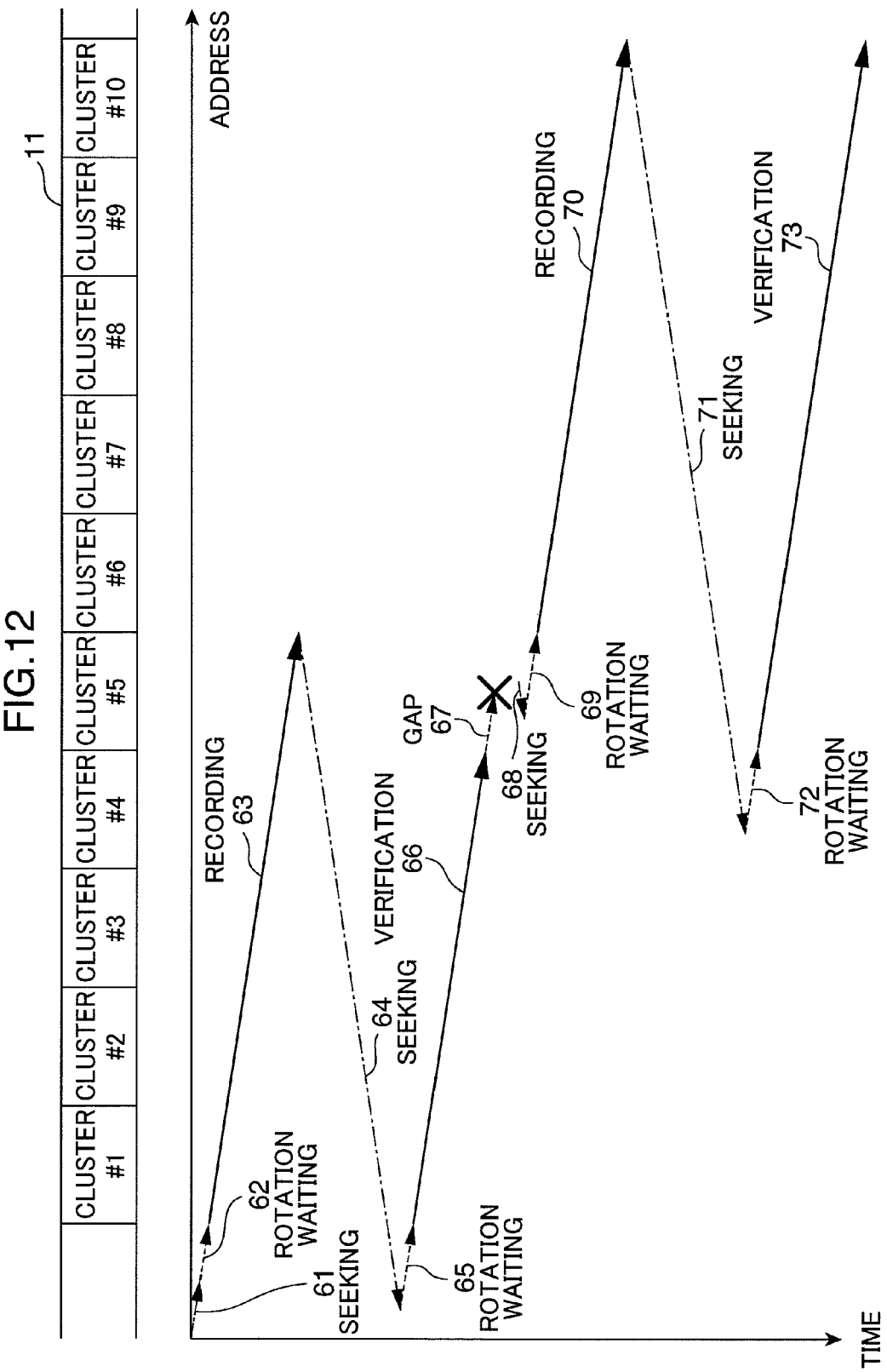
FIG. 12 is a chart showing another operation of the information recording apparatus in chronological order when an error occurred in the gap region.

If the error is judged to have occurred in the gap region, the absence of the region to be verified is judged in Step S11 by directly proceeding to Step S11 (FIG. 2) without performing anything, and the gap region may be verified when the recording region is verified next time. In other words, when an error is judged to have occurred in the gap region by the error region discriminator 23, the verification controller 32 does not immediately verify the gap region, but verifies the gap region where the error occurred when the next data is verified after the recording thereof is completed. FIG. 12 is a chart showing another operation of the information recording apparatus 1 in chronological order when an error occurred in the gap region.

As shown in FIG. 12, when an error occurred in a gap region 67, a seeking motion 68 and a rotation waiting motion 69 are performed and the record processing is performed to a recording region 70 following the gap region 67. When the record processing in the recording region 70 is completed, a seeking motion 71 and a rotation waiting motion 72 are performed to verify from the leading end of the gap region 67 (verification region 73). The verification region 73 at this time is the sum of the gap region 67 and the recording region 70. Thus, the seeking motions and the rotation waiting motions at the time of verifying the gap region can be reduced and a recording time can be shortened.

In Step S72 of FIG. 10, if an error occurred due to late recording preparation such as switching of the modem 19 and the error correction coder 20 and generation of recording data, the interval of the gap region may be extended. Instead of extending the gap region, multiple speed may be reduced. In other words, the error processor 24 extends the interval of the gap region when an error is discriminated to have occurred in the gap region by the error region discriminator 23 and the recording preparation is discriminated to be later for the start of data recording by the continuous recording controller 33.

Figure 13:
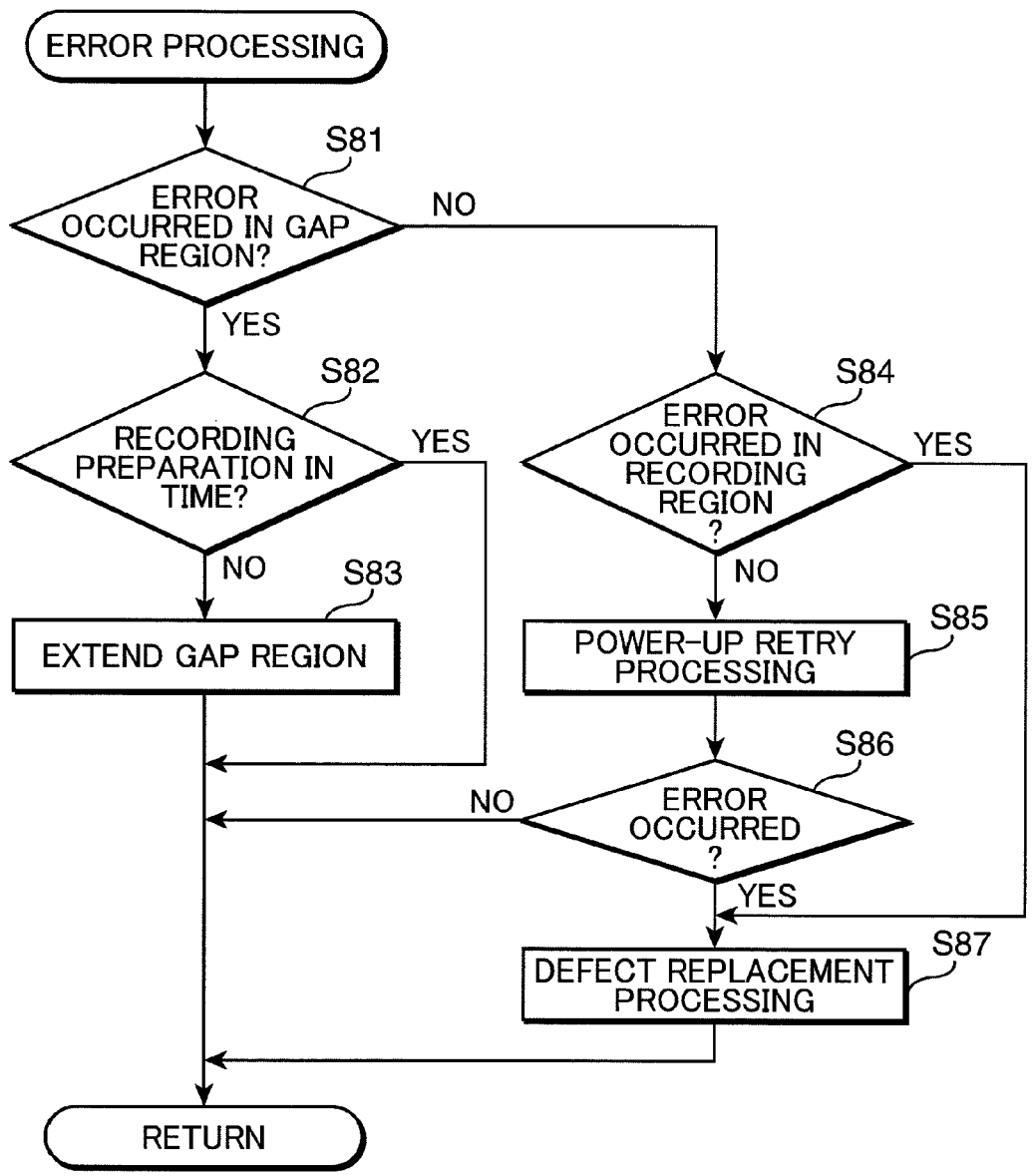
FIG. 13 is a flow chart showing a modification of the error processing in the embodiment.

FIG. 13 is a flow chart showing a modification of the error processing in this embodiment. In FIG. 13, the processings in Steps S81, S84 to S87 are not described since they are the same as those in Steps S71, S73 to S76 shown in FIG. 10.

If an error is judged to have occurred in the gap region (YES in Step S81), the error processor 24 judges whether or not the recording preparation was in time in Step S82. The continuous recording controller 33 discriminates whether or not the recording preparation was in time in the event of the error. Information on whether or nor the recording preparation was in time is included in a status returned from the continuous recording controller 33 in the event of the error. Thus, the error processor 24 can judge whether or not the recording preparation was in time by confirming the status returned from the continuous recording controller 33.

Here, if the recording preparation is judged to have been in time (YES in Step S82), the error processing is ended. After the error processing is ended, the gap region is verified in Step S6. On the other hand, if it is judged that the recording preparation was not in time (NO in Step S82), a processing of Step S83 follows.

Subsequently, in Step S83, the error processor 24 extends the interval of the gap region. For example, the error processor 24 extends the interval of the gap region by an amount corresponding to a specified sector number (or cluster number).

In this way, the interval of the gap region is extended when the recording preparation was not in time for the recording start timing, wherefore the size of the gap region can be optimally set at the time of recording at a high multiple speed of shortening a gap region passing time.

The processing for extending the interval of the gap region and the one for reducing the multiple speed may be performed not every time an error occurred, but when a specified number of or more errors occurred. They may be also performed when errors occurred at a specified frequency or higher. This can prevent an increase in the recording time due to errors which accidentally occurred.

Although the drive controller 22 issues the record command designating the record processing sector number in Step S1 of FIG. 2, the record command is not limited to this and any record command will do provided that it can designate the recording region. For example, the drive controller 22 may designate a record processing cluster number. Alternatively, the drive controller 22 may designate a recording start address and a recording end address. The addresses may be physical addresses or logical addresses.

Similarly, although the drive controller 22 issues the verify command designating the verify processing sector number, the record processing sector number and the gap sector number in Step S6 of FIG. 2, the verify command is not limited to this and any verify command will do provided that it can designate the sizes of the verification region, the gap region and the recording region. For example, the drive controller 22 may designate a verify processing cluster number, a record processing cluster number and a gap cluster number. Alternatively, the drive controller 22 may designate a start address and an end address of each of the verification region, the gap region and the recording region. The addresses may be physical addresses or logical addresses.

The gap sector number may be changed according to the multiple speed. Since this can substantially fix the gap region passing time, a time required for the recording preparation can be ensured regardless of the multiple speed. Similarly, the gap sector number may be changed according to a radial position, a track position, a cluster number of the track or a disc rotating speed.

Although the gap sector number is designated in this embodiment, the present invention is not limited to this. For example, the gap sector number may be fixed instead of being designated. For example, the gap sector number may be such a fixed value that can ensure a time required for the recording preparation for the recording in the entire region of the disc. For example, the gap sector number as a fixed value may be managed for each radial position, track position, the multiple speed, cluster number of the track or disc rotating speed and may be switched according to the radial position, the track position, the multiple speed, the cluster number in the track or the disc rotating speed. The gap sector number may also be designated as another command.

Although the respective functional blocks of the present invention are typically realized as software, they may be realized as an LSI which is an integrated circuit. Each functional block may be individually formed into one chip or some or all of the functional blocks may be formed into one chip. Here, the integrated circuit is called an LSI, but it may be called an IC, a system LSI, a super LSI or an ultra LSI depending on an integration degree. The integrated circuit is not limited to the LSI and may also be realized by a dedicated circuit or a general-purpose processor. After the production of the LSI, a programmable FPGA (Filed Programmable Gate Array) or a reconfigurable processor capable of reconfiguring connections and settings of circuit cells in the LSI may be utilized. Further, with the advent of an integrated circuit technology replacing LSIs due to a progress in semiconductor technology or another derived technology, the functional blocks may be, of course, integrated using such technology. For example, adaptation and the like of biotechnology are a possible integrated circuit technology replacing LSIs.

The above specified embodiment mainly includes inventions having the following constructions.

An information recording apparatus according to one aspect of the present invention comprises a recorder for recording data on an information recording medium; a verifier for verifying whether or not the data recorded by the recorder can be correctly reproduced; a continuous recorder for providing a gap region of a specified interval between a verification region to be verified by the verifier and a recording region to have data recorded therein by the recorder and successively performing a verify processing and a record processing with rotation waiting in between; an error region discriminator for discriminating an error region in the event of an error in the process of performing the verify processing and the record processing by the continuous recorder; and an error processor for performing an error processing according to the error region discriminated by the error region discriminator, wherein the error processor performs an error processing different from the one performed when an error occurred in either one of the verification region and the recording region if an error is discriminated to have occurred in the gap region by the error region discriminator.

According to this construction, the data is recorded on the information recording medium and it is verified whether or not the recorded data can be correctly reproduced. The gap region of the specified interval is provided between the verification region to be verified and the recording region to have the data recorded therein, and the verify processing and the record processing are successively performed with rotation waiting in between. When an error occurred in the process of performing the verify processing and the record processing, an error region is discriminated and the error processing is performed according to the region where the discriminated error occurred. At this time, if the error is discriminated to have occurred in the gap region, the error processing is performed which is different from the one performed when the error is discriminated to have occurred in either one of the verification region and the recording region.

Thus, the error processing suitable for the error region is performed and unnecessary defect replacement processing and retry processing are not performed, wherefore a recording time can be shortened. Further, since a spare region is effectively utilized by performing no unnecessary defect replacement processing, it can be prevented that data cannot be recorded on the information recording medium.

In the above information recording apparatus, the error processor preferably performs an error processing including a defect replacement processing for recording the data to be recorded in a spare region when the error is discriminated to have occurred in either one of the verification region and the recording region by the error region discriminator and performs an error processing including no defect replacement processing when the error is discriminated to have occurred in the gap region by the error region discriminator.

According to this construction, the error processing including the defect replacement processing for recording the data to be recorded in the spare region is performed when the error is discriminated to have occurred in either one of the verification region and the recording region and the error processing including no defect replacement processing is performed when the error is discriminated to have occurred in the gap region.

Thus, the unnecessary defect replacement processing is not performed when the error occurred in the gap region, wherefore the recording time can be shortened. Further, the spare region is effectively utilized by performing no unnecessary defect replacement processing when the error occurred in the gap region, wherefore it can be prevented that data cannot be recorded on the information recording medium.

In the above information recording apparatus, the error processor preferably extends the interval of the gap region when an error is discriminated to have occurred in the gap region by the error region discriminator and it is discriminated by the continuous recorder that recording preparation was not in time for the start of data recording.

According to this construction, the interval of the gap region is extended when the error is discriminated to have occurred in the gap region and it is discriminated that the recording preparation was not in time for the start of data recording.

Since late recording preparation for the start of data recording means that the interval of the gap region is short, the recording preparation can be reliably performed between the verify processing and the record processing by extending the interval of the gap region.

In the above information recording apparatus, the error region discriminator preferably includes a recording error discriminator for discriminating based on information indicating an error occurrence in the recording region whether or not the error occurred in the recording region, a verification completion discriminator for discriminating based on information indicating degrees of completion of the verify processing and the record processing whether or not the verification of the data recorded in the verification region has been completed, and a region specifier for specifying the error region based on discrimination results of the recording error discriminator and the verification completion discriminator.

According to this construction, whether or not the error occurred in the recording region is discriminated, whether or not the verification of the data recorded in the verification region has been completed is discriminated and the error region is specified based on the discrimination results.

Thus, when no error occurrence in the recording region is discriminated, in which of the verification region and the gap region the error occurred can be discriminated by discriminating whether or not the verification of the data recorded in the verification region has been completed. Therefore, the error region can be reliably specified.

In the above information recording apparatus, the error region discriminator preferably includes a recording error discriminator for discriminating based on information indicating an error occurrence in the recording region whether or not the error occurred in the recording region, a gap region error discriminator for discriminating based on information indicating an error occurrence in the gap region whether or not the error occurred in the gap region, and a region specifier for specifying the error region based on discrimination results of the recording error discriminator and the gap region error discriminator.

According to this construction, whether or not the error occurred in the recording region is discriminated, whether or not the error occurred in the gap region is discriminated and the error region is specified based on the discrimination results.

Thus, when no error occurrence in the recording region is discriminated, in which of the verification region and the gap region the error occurred can be discriminated by discriminating whether or not the error occurred in the gap region. Therefore, the error region can be reliably specified.

In the above information recording apparatus, the error region discriminator preferably determines the error region based on an address of the error region, that of the recording region and that of the gap region.

According to this construction, the error region is determined based on the address of the error region, that of the recording region and that of the gap region. Thus, the error occurrence in the recording region can be discriminated by comparing the address of the error region and that of the recording region, and in which of the gap region and the recording region the error occurred can be discriminated by comparing the address of the error region and that of the gap region.

In the above information recording apparatus, the error region discriminator preferably determines the error region based on the number of sectors in a region where the processing has been completed, the number of sectors in the verification region and the number of sectors in the gap region.

According to this construction, the error region is determined based on the number of sectors in the region where the processing has been completed, the number of sectors in the verification region and the number of sectors in the gap region. Thus, the error occurrence in the verification region can be discriminated by comparing the number of sectors in the region where the processing has been completed and the number of sectors in the verification region and in which of the gap region and the recording region the error occurred can be discriminated by comparing the number of sectors in the region where the processing has been completed and the sum of the number of sectors in the verification region and the number of sectors in the gap region.

In the above information recording apparatus, the error region discriminator preferably discriminates in which of the verification region, the gap region and the recording region the error occurred.

According to this construction, in which of the verification region, the gap region and the recording region the error occurred can be discriminated.

In the above information recording apparatus, the verifier preferably verifies the gap region where the error occurred at the time of verification of the next data after the recording of the next data is completed if the error is discriminated to have occurred in the gap region by the error region discriminator.

According to this construction, the gap region where the error occurred is verified at the time of verification of the next data after the recording of the next data is completed if the error is discriminated to have occurred in the gap region.

Thus, the gap region is not verified immediately after the error occurred in the gap region, but verified at the time of verification of the next data after the recording of the next data is completed, wherefore a seeking time and a rotation waiting time upon verifying the gap region can be shortened.

An information recording method according to another aspect of the present invention comprises a recording step of recording data on an information recording medium; a verifying step of verifying whether or not the data recorded in the recording step can be correctly reproduced; a continuous recording step of providing a gap region of a specified interval between a verification region to be verified in the verifying step and a recording region to have data recorded therein in the recording step and successively performing a verify processing and a record processing with rotation waiting in between; an error region discriminating step of discriminating an error region in the event of an error in the process of performing the verify processing and the record processing in the continuous recording step; and an error processing step of performing an error processing according to the error region discriminated in the error region discriminating step, wherein, in the error processing step, an error processing different from the one performed when an error occurred in either one of the verification region and the recording region is performed if an error is discriminated to have occurred in the gap region in the error region discriminating step.

According to this construction, the data is recorded on the information recording medium and it is verified whether or not the recorded data can be correctly reproduced. The gap region of the specified interval is provided between the verification region to be verified and the recording region to have the data recorded therein, and the verify processing and the record processing are successively performed with rotation waiting in between. When an error occurred in the process of performing the verify processing and the record processing, an error region is discriminated and the error processing is performed according to the region where the discriminated error occurred. At this time, if the error is discriminated to have occurred in the gap region, the error processing is performed which is different from the one performed when the error is discriminated to have occurred in either one of the verification region and the recording region.

Thus, the error processing suitable for the error region is performed and unnecessary defect replacement processing and retry processing are not performed, wherefore a recording time can be shortened. Further, since a spare region is effectively utilized by performing no unnecessary defect replacement processing, it can be prevented that data cannot be recorded on the information recording medium.

In the above information recording method, it is preferable that, in the error processing step, an error processing including a defect replacement processing for recording the data to be recorded in a spare region is performed when the error is discriminated to have occurred in either one of the verification region and the recording region in the error region discriminating step and an error processing including no defect replacement processing is performed when the error is discriminated to have occurred in the gap region in the error region discriminating step.

According to this construction, the error processing including the defect replacement processing for recording the data to be recorded in the spare region when the error is discriminated to have occurred in either one of the verification region and the recording region and the error processing including no defect replacement processing is performed when the error is discriminated to have occurred in the gap region.

Thus, the recording time can be shortened since the unnecessary defect replacement processing is not performed in the event of an error in the gap region. Further, it can be prevented that data cannot be recorded on the information recording medium since the spare region is effectively utilized by not performing the unnecessary defect replacement processing in the event of an error in the gap region.

In the above information recording method, the interval of the gap region is preferably extended in the error processing step when the error is discriminated to have occurred in the gap region in the error region discriminating step and it is discriminated in the continuous recording step that recording preparation was not in time for the start of data recording.

According to this construction, the interval of the gap region is extended when the error is discriminated to have occurred in the gap region and it is discriminated that the recording preparation was not in time for the start of data recording.

Since late recording preparation for the start of data recording means that the interval of the gap region is short, the recording preparation can be reliably performed between the verify processing and the record processing by extending the interval of the gap region.

In the above information recording method, the error region discriminating step preferably includes a recording error discriminating step of discriminating based on information indicating an error occurrence in the recording region whether or not the error occurred in the recording region, a verification completion discriminating step of discriminating based on information indicating degrees of completion of the verify processing and the record processing whether or not the verification of the data recorded in the verification region has been completed, and a region specifying step of specifying the error region based on discrimination results in the recording error discriminating step and the verification completion discriminating step.

According to this construction, whether or not the error occurred in the recording region is discriminated, whether or not the verification of the data recorded in the verification region has been completed is discriminated and the error region is specified based on the discrimination results.

Thus, when no error occurrence in the recording region is discriminated, in which of the verification region and the gap region the error occurred can be discriminated by discriminating whether or not the verification of the data recorded in the verification region has been completed. Therefore, the error region can be reliably specified.

In the above information recording method, the error region discriminating step preferably includes a recording error discriminating step of discriminating based on information indicating an error occurrence in the recording region whether or not the error occurred in the recording region, a gap region error discriminating step of discriminating based on information indicating an error occurrence in the gap region whether or not the error occurred in the gap region, and a region specifying step of specifying the error region based on discrimination results in the recording error discriminating step and the gap region error discriminating step.

According to this construction, whether or not the error occurred in the recording region is discriminated, whether or not the error occurred in the gap region is discriminated and the error region is specified based on the discrimination results.

Thus, when no error occurrence in the recording region is discriminated, in which of the verification region and the gap region the error occurred can be discriminated by discriminating whether or not the error occurred in the gap region. Therefore, the error region can be reliably specified.

In the above information recording method, the error region is preferably determined in the error region discriminating step based on an address of the error region, that of the recording region and that of the gap region.

According to this construction, the error region is determined based on the address of the error region, that of the recording region and that of the gap region. Thus, the error occurrence in the recording region can be discriminated by comparing the address of the error region and that of the recording region, and in which of the gap region and the recording region the error occurred can be discriminated by comparing the address of the error region and that of the gap region.

In the above information recording method, the error region is preferably determined in the error region discriminating step based on the number of sectors in a region where the processing has been completed, the number of sectors in the verification region and the number of sectors in the gap region.

According to this construction, the error region is determined based on the number of sectors in the region where the processing has been completed, the number of sectors in the verification region and the number of sectors in the gap region. Thus, the error occurrence in the verification region can be discriminated by comparing the number of sectors in the region where the processing has been completed and the number of sectors in the verification region and in which of the gap region and the recording region the error occurred can be discriminated by comparing the number of sectors in the region where the processing has been completed and the sum of the number of sectors in the verification region and the number of sectors in the gap region.

In the above information recording method, it is discriminated in the error region discriminating step in which of the verification region, the gap region and the recording region the error occurred.

According to this construction, in which of the verification region, the gap region and the recording region the error occurred can be discriminated.

In the above information recording method, it is preferable to further comprise a gap region verifying step of verifying the gap region where the error occurred at the time of verification of the next data after the recording of the next data is completed if the error is discriminated to have occurred in the gap region in the error region discriminating step.

According to this construction, the gap region where the error occurred is verified at the time of verification of the next data after the recording of the next data is completed if the error is discriminated to have occurred in the gap region.

Thus, the gap region is not verified immediately after the error occurred in the gap region, but verified at the time of verification of the next data after the recording of the next data is completed, wherefore a seeking time and a rotation waiting time upon verifying the gap region can be shortened.

An integrated circuit according to still another aspect of the present invention comprises an error region discriminating circuit for discriminating an error region in the event of an error in the process of providing a gap region of a specified interval between a verification region to be verified as to whether or not recorded data can be correctly reproduced and a recording region to have data recorded therein and successively performing a verify processing and a record processing with rotation waiting in between; and an error processing circuit for performing an error processing according to the error region discriminated by the error region discriminating circuit, wherein the error processing circuit performs an error processing different from the one performed when an error occurred in either one of the verification region and the recording region if an error is discriminated to have occurred in the gap region by the error region discriminating circuit.

According to this construction, the error region is discriminated when the error occurred in the process of providing the gap region of the specified interval between the verification region to be verified as to whether or not the recorded data can be correctly reproduced and the recording region to have the data recorded therein and successively performing the verify processing and the record processing with rotation waiting in between, and the error processing is performed according to the region where the discriminated error occurred. At this time, if the error is discriminated to have occurred in the gap region, the error processing is performed which is different from the one performed when the error is discriminated to have occurred in either one of the verification region and the recording region.

Thus, the error processing suitable for the error region is performed and unnecessary defect replacement processing and retry processing are not performed, wherefore a recording time can be shortened. Further, since a spare region is effectively utilized by performing no unnecessary defect replacement processing, it can be prevented that data cannot be recorded on the information recording medium.

An information recording apparatus, an information recording method and an integrated circuit according to the present invention are capable of recording within a short period of time which recording can guarantee data reliability, and are applicable to optical disc drives and the like.

This application is based on Japanese Patent Application No. 2009-051726 filed on Mar. 5, 2009, the contents of which are hereby incorporated by reference.

The specific embodiments or examples described in the detailed description of the present invention are merely to clarify the technical contents of the present invention, the present invention should not be interpreted while being narrowly limited to such specific examples and various changes can be made within the spirit of the present invention and the scope as claimed below.

What is claimed is:

1. An information recording apparatus, comprising:
a recorder for recording data on an information recording medium;
a verifier for verifying whether or not the data recorded by the recorder can be correctly reproduced;
a continuous recorder for providing a gap region of a specified interval between a verification region to be verified by the verifier and a recording region to have data recorded therein by the recorder and successively performing a verify processing and a record processing with rotation waiting in between;
an error region discriminator for discriminating an error region in the event of an error in the process of performing the verify processing and the record processing by the continuous recorder; and
an error processor for performing an error processing according to the error region discriminated by the error region discriminator,
wherein the error processor performs an error processing different from the one performed when an error occurred in either one of the verification region and the recording region if an error is discriminated to have occurred in the gap region by the error region discriminator.

2. An information recording apparatus according to claim 1, wherein the error processor performs an error processing including a defect replacement processing for recording the data to be recorded in a spare region when the error is discriminated to have occurred in either one of the verification region and the recording region by the error region discriminator and performs an error processing including no defect replacement processing when the error is discriminated to have occurred in the gap region by the error region discriminator.

3. An information recording apparatus according to claim 1, wherein the error processor extends the interval of the gap region when an error is discriminated to have occurred in the gap region by the error region discriminator and it is discriminated by the continuous recorder that recording preparation was not in time for the start of data recording.

4. An information recording apparatus according to claim 1, wherein the error region discriminator includes:
a recording error discriminator for discriminating based on information indicating an error occurrence in the recording region whether or not the error occurred in the recording region,
a verification completion discriminator for discriminating based on information indicating degrees of completion of the verify processing and the record processing whether or not the verification of the data recorded in the verification region has been completed, and
a region specifier for specifying the error region based on discrimination results of the recording error discriminator and the verification completion discriminator.

5. An information recording apparatus according to claim 1, wherein the error region discriminator includes:
a recording error discriminator for discriminating based on information indicating an error occurrence in the recording region whether or not the error occurred in the recording region,
a gap region error discriminator for discriminating based on information indicating an error occurrence in the gap region whether or not the error occurred in the gap region, and
a region specifier for specifying the error region based on discrimination results of the recording error discriminator and the gap region error discriminator.

6. An information recording apparatus according to claim 1, wherein the error region discriminator determines the error region based on an address of the error region, that of the recording region and that of the gap region.

7. An information recording apparatus according to claim 1, wherein the error region discriminator determines the error region based on the number of sectors in a region where the processing has been completed, the number of sectors in the verification region and the number of sectors in the gap region.

8. An information recording apparatus according to claim 1, wherein the error region discriminator discriminates in which of the verification region, the gap region and the recording region the error occurred.

9. An information recording apparatus according to claim 1, wherein the verifier verifies the gap region where the error occurred at the time of verification of the next data after the recording of the next data is completed if the error is discriminated to have occurred in the gap region by the error region discriminator.

10. An information recording method, comprising:
a recording step of recording data on an information recording medium;
a verifying step of verifying whether or not the data recorded in the recording step can be correctly reproduced;
a continuous recording step of providing a gap region of a specified interval between a verification region to be verified in the verifying step and a recording region to have data recorded therein in the recording step and successively performing a verify processing and a record processing with rotation waiting in between;
an error region discriminating step of discriminating an error region in the event of an error in the process of performing the verify processing and the record processing in the continuous recording step; and
an error processing step of performing an error processing according to the error region discriminated in the error region discriminating step,
wherein, in the error processing step, an error processing different from the one performed when an error occurred in either one of the verification region and the recording region is performed if an error is discriminated to have occurred in the gap region in the error region discriminating step.

11. An information recording method according to claim 10, wherein, in the error processing step, an error processing including a defect replacement processing for recording the data to be recorded in a spare region is performed when the error is discriminated to have occurred in either one of the verification region and the recording region in the error region discriminating step and an error processing including no defect replacement processing is performed when the error is discriminated to have occurred in the gap region in the error region discriminating step.

12. An information recording method according to claim 10, wherein the interval of the gap region is extended in the error processing step when the error is discriminated to have occurred in the gap region in the error region discriminating step and it is discriminated in the continuous recording step that recording preparation was not in time for the start of data recording.

13. An information recording method according to claim 10, wherein the error region discriminating step includes:
- a recording error discriminating step of discriminating based on information indicating an error occurrence in the recording region whether or not the error occurred in the recording region,
- a verification completion discriminating step of discriminating based on information indicating degrees of completion of the verify processing and the record processing whether or not the verification of the data recorded in the verification region has been completed, and
- a region specifying step of specifying the error region based on discrimination results in the recording error discriminating step and the verification completion discriminating step.

14. An information recording method according to claim 10, wherein the error region discriminating step includes:
- a recording error discriminating step of discriminating based on information indicating an error occurrence in the recording region whether or not the error occurred in the recording region,
- a gap region error discriminating step of discriminating based on information indicating an error occurrence in the gap region whether or not the error occurred in the gap region, and
- a region specifying step of specifying the error region based on discrimination results in the recording error discriminating step and the gap region error discriminating step.

15. An information recording method according to claim 10, wherein the error region is determined in the error region discriminating step based on an address of the error region, that of the recording region and that of the gap region.

16. An information recording method according to claim 10, wherein the error region is determined in the error region discriminating step based on the number of sectors in a region where the processing has been completed, the number of sectors in the verification region and the number of sectors in the gap region.

17. An information recording method according to claim 10, wherein it is discriminated in the error region discriminating step in which of the verification region, the gap region and the recording region the error occurred.

18. An information recording method according to claim 10, further comprising a gap region verifying step of verifying the gap region where the error occurred at the time of verification of the next data after the recording of the next data is completed if the error is discriminated to have occurred in the gap region in the error region discriminating step.

19. An integrated circuit, comprising:
- an error region discriminating circuit for discriminating an error region in the event of an error in the process of providing a gap region of a specified interval between a verification region to be verified as to whether or not recorded data can be correctly reproduced and a recording region to have data recorded therein and successively performing a verify processing and a record processing with rotation waiting in between; and
- an error processing circuit for performing an error processing according to the error region discriminated by the error region discriminating circuit,
- wherein the error processing circuit performs an error processing different from the one performed when an error occurred in either one of the verification region and the recording region if an error is discriminated to have occurred in the gap region by the error region discriminating circuit.

\* \* \* \* \*